United States Patent
Hori et al.

(10) Patent No.: US 8,363,835 B2
(45) Date of Patent: *Jan. 29, 2013

(54) METHOD FOR TRANSMISSION/RECEPTION OF CONTENTS USAGE RIGHT INFORMATION IN ENCRYPTED FORM, AND DEVICE THEREOF

(75) Inventors: Yoshihiro Hori, Gifu (JP); Yoshizo Sato, Katano (JP); Keiji Horiuchi, Higashiosaka (JP)

(73) Assignee: Sanyo Electric Co., Ltd.

( * ) Notice: Subject to any disclaimer, the term of this patent is extended or adjusted under 35 U.S.C. 154(b) by 1735 days.

This patent is subject to a terminal disclaimer.

(21) Appl. No.: 11/185,979

(22) Filed: Jul. 21, 2005

(65) Prior Publication Data
US 2006/0018474 A1 Jan. 26, 2006

(30) Foreign Application Priority Data

Jul. 21, 2004 (JP) ................................. 2004-213629
Oct. 5, 2004 (JP) ................................. 2004-292168

(51) Int. Cl.
 *H04L 29/06* (2006.01)
(52) U.S. Cl. .............................. 380/255; 380/29; 380/30
(58) Field of Classification Search .................. 380/255, 380/29, 30
See application file for complete search history.

(56) References Cited

U.S. PATENT DOCUMENTS

| | | | | |
|---|---|---|---|---|
| 4,292,580 A * | 9/1981 | Ott et al. ........................ | 323/212 |
| 4,759,063 A * | 7/1988 | Chaum ............................ | 380/30 |
| 5,199,070 A * | 3/1993 | Matsuzaki et al. ............... | 380/30 |
| 5,535,276 A * | 7/1996 | Ganesan ......................... | 713/155 |
| 5,606,617 A * | 2/1997 | Brands ............................ | 380/30 |
| 5,737,419 A * | 4/1998 | Ganesan ......................... | 713/169 |
| 5,768,389 A * | 6/1998 | Ishii ................................ | 380/30 |
| 6,128,605 A * | 10/2000 | Saito et al. ...................... | 705/57 |
| 6,154,841 A * | 11/2000 | Oishi ............................. | 713/180 |
| 6,320,966 B1 * | 11/2001 | Brands ............................ | 380/59 |
| 6,351,536 B1 * | 2/2002 | Sasaki ............................ | 380/44 |
| 6,741,991 B2 * | 5/2004 | Saito ............................... | 1/1 |
| 6,744,894 B1 * | 6/2004 | Saito ............................. | 380/277 |
| 7,123,721 B2 * | 10/2006 | Panjwani et al. ............ | 380/270 |
| 7,181,629 B1 * | 2/2007 | Hatanaka et al. ............. | 713/194 |
| 7,302,415 B1 * | 11/2007 | Saito ............................... | 705/57 |
| 7,334,128 B2 * | 2/2008 | Ganesan et al. ............. | 713/168 |
| 7,590,850 B2 * | 9/2009 | Kim ............................... | 713/176 |
| 7,694,141 B2 * | 4/2010 | Lauter et al. ................. | 713/171 |
| 7,840,993 B2 * | 11/2010 | Ganesan et al. ................ | 726/7 |
| RE42,163 E * | 2/2011 | Saito ............................. | 380/277 |
| 7,945,517 B2 * | 5/2011 | Hori et al. ....................... | 705/51 |
| 8,014,527 B2 * | 9/2011 | Kang ............................. | 380/273 |
| 2003/0105718 A1 * | 6/2003 | Hurtado et al. ................ | 705/51 |
| 2005/0005146 A1 * | 1/2005 | Kryeziu ......................... | 713/193 |

FOREIGN PATENT DOCUMENTS

JP 2004-133654 A 4/2004

* cited by examiner

*Primary Examiner* — David García Cervetti
(74) *Attorney, Agent, or Firm* — McDermott Will & Emery LLP

(57) ABSTRACT

Confidential data such as license data is encrypted using the symmetric key encryption algorithm alone which requires smaller computation amount, and is readily realized by hardware elements, as compared with the public key encryption algorithm. A license-data transmitter (y) encrypts license data LIC using two keys Kscy and Kssx supplied from a license-data receiver (x). The license data is provided to the license-data receiver in the form of encrypted license data E(Kscy, E(Kssx, LIC)). This enables high-speed processing without deterioration in security even if data access such as recording/readout of data is repeated.

4 Claims, 15 Drawing Sheets

METHOD FOR TRANSMISSION/RECEPTION OF CONTENTS USAGE RIGHT INFORMATION IN ENCRYPTED FORM, AND DEVICE THEREOF

BACKGROUND OF THE INVENTION

1. Field of the Invention

The present invention relates to a data input/output technique, and particularly to a technique for input/output of encrypted data, which is to be kept secret, between a storage device and a host device.

2. Description of the Related Art

As a contents data distribution system with improved security of license data, a contents data distribution system disclosed in Japanese Patent Application Laid-open No. 2004-133654 is known, for example. With such a system, the devices handling the license data in the non-encrypted form are classified into three kinds of devices, i.e., a server, a memory card (storage device), and a decoder (user device). Transmission/reception of the license data is performed between the devices (between the server and the storage device, or between the storage device and the user device) through an encrypted communication path established therebetween. Note that each of the server, the storage device, and the user device, includes a TRM (Tamper Resistant Module) for handling the license data in the non-encrypted form.

With establishment of the encrypted communication path, first, a device receiving license data (which will be referred to as "license receiver") transmits a certificate including a public key to a device providing the license data (which will be referred to as "license provider"). Then, the license provider verifies the certificate of the license receiver. As a result of the verification, only in a case that determination has been made that the certificate is valid, key sharing is performed between the two devices using the public key of the license receiver included in the certificate. Then, the license data is encrypted using two keys transmitted from the license receiver. The encrypted license data is transmitted from the license provider to the license receiver. One of the aforementioned two key is a temporary symmetric key. The other is a public key which is individually stored by the license receiver.

The TRM is a circuit module which physically protects the security thereof. The TRM has a configuration which protects itself from access from external circuits, except through the encrypted communication path.

Note that in a case of acquisition of the license data, the memory card, which is mounted to a terminal having a function of communication with the server, receives the license data from the server through the terminal. On the other hand, in a case of using contents, the memory card, which is mounted to the terminal including a built-in decoder, transmits the license data to the decoder through the terminal.

As described above, such a contents distribution service provides encryption of the contents data and security of the license data, thereby ensuring copyright protection with regard to the contents. Such ensuring of the contents copyright protection protects the right of the copyright holder of the contents, thereby providing contents with high security. This helps to increase the lineup of contents available as distribution services, thereby meeting the needs of the user over a wider range.

Video contents having a specification of the high-definition TV are being widespread. Here, video contents having a specification of high-definition TVs will be referred to as "HD contents". On the other hand, video contents having a specification of conventional TVs will be referred to as "SD contents".

HD contents have a larger data amount per unit time than that of the SD contents. For example, with the MPEG2 method employed in digital broadcasting, the HD contents have approximately three times the date amount per unit time of that of the SD contents. Such a system handling a large data amount requires higher-speed access of the storage device storing the HD contents.

Now, let us consider an arrangement in which the copyright protection function of the conventional systems is applied to such HD contents. With the conventional systems, transmission/reception of the license data is performed using the public key encryption system. The public key encryption system requires longer time than with the symmetric key encryptosystem. That is to say, with the conventional systems, transmission/reception of the license data requires access time corresponding to computation time for the public key encryptosystem.

In a case that the license data is recorded in increments of programs or the like, and the programs are reproduced in increments of programs, the system accesses the license data with a low frequency. Accordingly, in this case, the access time is negligible. On the other hand, in a case of providing special reproduction (skip reproduction, program reproduction which is reproduction of parts of multiple programs following a sequence programmed by the user, and so forth), the system accesses the license data with a higher frequency. Accordingly, such special reproduction requires higher-speed access of the license data.

SUMMARY OF THE INVENTION

The present invention has been made in view of the above problems, and it is an object thereof to provide a technique for reducing access time required for input/output of encrypted confidential data between a storage device and a host device.

In order to solve the above problems, the present invention has features as follows.

A first aspect of the present invention relates to a contents usage right information transmission method for transmission/reception of contents usage right information containing a contents key for decrypting encrypted contents data. The contents usage right information transmission method comprises: establishing an encrypted communication path for transmission/reception of the contents usage right information; and a second step for transmission/reception of the contents usage right information through the encrypted communication path. Furthermore, the establishing an encrypted communication path includes a step for a transmitter of the contents usage right information verifying a receiver of the contents usage right information, and a step for sharing a first symmetric key between the transmitter and the receiver using the public key cryptosystem in a case that the receiver has been authorized. Furthermore, the second step includes a step for sharing a second symmetric key between the transmitter and the receiver at the time of transmission of the contents usage right information, and a step for encrypting the contents usage right information using the first symmetric key and the second symmetric key, and transmitting the encrypted contents usage right information to the receiver.

Such an arrangement allows transmission/reception of confidential data such as contents usage right information and so forth in an encrypted form using the symmetric key encryption algorithm alone, without using the public key encryption algorithm, after establishment of an encrypted communication path. The symmetric key encryption algorithm requires smaller computation amount than that of the public key encryption algorithm. Furthermore, the symmetric key encryption algorithm can be readily realized by hardware means. Thus, such an arrangement using the symmetric key encryption algorithm alone improves the processing efficiency and the processing speed. Furthermore, with such an arrangement, the contents usage right information is encrypted twofold for transmission/reception thereof, thereby enabling efficient transmission/reception of encrypted data without deterioration in the security.

The step for sharing the second symmetric key may be executed using a symmetric-key cryptosystem. The establishing an encrypted communication path may further include a step for sharing a third symmetric key between the transmitter and the receiver for sharing the second symmetric key. Furthermore, in the step for sharing the second symmetric key, the second symmetric key is encrypted using the third symmetric key, thereby sharing the second symmetric key between the transmitter and the receiver. Such an arrangement in which the second symmetric key is shared using the symmetric key cryptosystem improves the processing efficiency and the processing speed. The third symmetric key may be shared using the public key cryptosystem. With an arrangement in which the third symmetric key is shared in the establishing an encrypted communication path using the public key cryptosystem, the processing using the public key cryptosystem, which requires large computation amount, does not affect the processing speed in the second step. Thus, such an arrangement allows transmission/reception of the confidential data with improved security without reducing the processing speed in the second step.

An arrangement may be made in which one of the transmitter and the receiver issues the first symmetric key, and the other issues the second symmetric key. This prevents leakage of contents usage right information even if either of the transmitter or the receiver is an unauthorized device, thereby improving the security of the system.

The first symmetric key may be held by the transmitter and the receiver even after completion of the second step for transmitting the next contents usage right information using the same symmetric key. Furthermore, at the time of transmission of the contents usage right information, in a case that the first symmetric key has been shared between the transmitter and the receiver, the establishing an encrypted communication path may be omitted. This enables consecutive transmission/reception of the contents usage right information in an encrypted form using the symmetric key encryption algorithm alone at high processing speed without deterioration in security. Also, an arrangement may be made in which the verification processing is omitted in a case of consecutive transmission/reception of the contents usage right information, thereby enabling high-speed processing without deterioration in the security. An arrangement may be made in which the first symmetric key is discarded in a case of disconnection of the encryption communication path. With such an arrangement, in a case that the encrypted communication path which has been once established cannot be maintained due to disconnection between the devices, either of the devices being turned off, or the like, for example, the first symmetric key is discarded, thereby disconnecting the encrypted communication path. This secures the security of the encrypted communication.

Furthermore, an arrangement may be made in which after completion of the transmitting and/or receiving the content usage right information, a new second symmetric key may be issued at the time of transmission of the next content usage right information. With such an arrangement, the contents usage right information is encrypted using a new second symmetric key issued for each transmission of the contents usage right information. This improves the security of the encrypted communication.

Furthermore, the establishing an encrypted communication path may further include a step for the receiver authorizing the transmitter. With such an arrangement, in a case that both the receiver and the transmitter have been mutually authenticated, the step for sharing the first symmetric key may be executed. With such an arrangement, the contents usage right information receiving device has a function of rejecting recording of the license data from a license-usage information providing device with insufficient security, or from an unauthorized license-usage information providing device. Such a function further improves the security of the devices, thereby properly protecting the right of the copyright holder or the like.

In the step for sharing the first symmetric key, the first symmetric key may be shared between the transmitter and the receiver using the Elliptic Curve Diffie-Hellman scheme. This enables sharing of the shared key with sufficient security based upon the public key cryptosystem using computation on an elliptic curve. Furthermore, an arrangement may be made in which the shared key once shared is held for encryption/decryption of the next license data. This reduces the computation amount for transmission/reception of the license data. Thus, this enables high-speed processing as well as enabling the circuit scale to be reduced.

A second aspect of the present invention relates to a contents usage right information providing device for providing contents usage right information containing a contents key for decrypting encrypted contents data to a contents usage right information receiving device. The contents usage right information providing device comprises: holding means for holding the contents usage right information; verification means for acquiring certification information from the contents usage right information receiving device, and verifying the validity of the certification information thus acquired; a first symmetric key sharing means for sharing a first symmetric key with the contents usage right information receiving device using the public key cryptosystem in a case that the verification means have authorized the contents usage right information receiving device; a second symmetric key sharing means for sharing a second symmetric key with the contents usage right information receiving device at the time of transmission of the contents usage right information; encrypting means for reading out the contents usage right information, and encrypting the contents usage right information using the first symmetric key and the second symmetric key; and contents usage right information transmitting means for transmitting the contents usage right information encrypted by the encryption means, to the contents usage right information receiving device.

A third aspect of the present invention relates to a contents usage right information receiving device for receiving contents usage right information containing a contents key for decrypting encrypted contents data from a contents usage right information providing device. The contents usage right information receiving device comprises: certification information transmission means for transmitting certification information thereof to the contents usage right information providing device; first symmetric key sharing means for sharing a first symmetric key with the contents usage right information providing device using the public key cryptosystem in a case that the contents usage right information providing device has authenticated the certification information; second symmetric key sharing means for sharing a second symmetric key with the contents usage right information providing device at the time of receiving the contents usage right information; contents usage right information receiving means for receiving the contents usage right information encrypted using the first symmetric key and the second symmetric key from the contents usage right information providing device; and decrypting means for decrypting the encrypted contents usage right information using the first symmetric key and the second symmetric key.

A fourth aspect of the present invention relates to a contents usage right information providing device for providing contents usage right information containing a contents key for decrypting encrypted contents data to a contents usage right information receiving device. The contents usage right information providing device comprises: an interface for controlling transmission/reception of data to/from the content usage right information receiving device; a symmetric key creating unit for creating a first symmetric key and a second symmetric key, each of which is a temporary key, for transmitting the content usage right information; a first encryption unit for encrypting data using a first public key set for the content usage right information receiving device; a second encryption unit for encrypting data using a second public key set for the content usage right information receiving device; a third encryption unit for further encrypting the data, which has been encrypted by the second encryption unit, using a third symmetric key created by the content usage right information receiving device; a fourth encryption unit for encrypting data using a fourth symmetric key created by the content usage right information receiving device; a fifth encryption unit for further encrypting the data using the second symmetric key, a decryption unit for decrypting data using the first symmetric key or the second symmetric key; and a control unit; wherein the control unit instructs the symmetric key creating unit to create the first symmetric key, the control unit receives the first public key through the interface, and transmits the first public key thus received, to the first encryption unit, the control unit receives the first symmetric key which has been encrypted using the first public key from the first encryption unit, and outputs encrypted first symmetric key thus received through the interface, the control unit receives the third symmetric key and the second public key, each of which has been encrypted using the first symmetric key, through the interface, and transmits the encrypted third symmetric key and the encrypted second public key to the decryption unit, the control unit instructs the symmetric key creating unit to create the second symmetric key, and transmitting the second symmetric key thus created to the second encrypting unit, the control unit receives the second symmetric key which has been encrypted using the second public key or the third symmetric key from the second encryption unit or the third encryption unit, and outputs encrypted second symmetric key thus received through the interface, the control unit receives the fourth symmetric key, which has been encrypted using either the first symmetric key or the second symmetric key, from the content usage right information receiving device through the interface, and transmits the encrypted fourth symmetric key to the decryption unit, the control unit receives encrypted content usage right information which has been encrypted using the fourth symmetric key and the second symmetric key from the fourth encryption unit or the fifth encryption unit, and outputs the encrypted content usage right information thus received through the interface.

When the control unit provides consecutively the content usage right information to the same content usage right information receiving device, the control unit may receive a new fourth symmetric key, which has been encrypted using either the first symmetric key or the second symmetric key, and transmits the new encrypted fourth symmetric key to the second decryption unit; and the control unit may output encrypted content usage right information, which has been encrypted using the new fourth symmetric key and the second symmetric key, through the interface.

The contents usage right information may include a contents key for encrypting contents data, and decrypting encrypted contents data. Furthermore, the contents usage right information providing device may further include: a contents usage right information creating unit for creating the contents usage right information; and a sixth encryption unit for encrypting the contents data using the contents key, and outputting the contents data thus encrypted.

The contents usage right information providing device may further include s storage unit. Furthermore, the storage unit may include a first storage unit for storing the encrypted contents data; and a second storage unit for storing the contents usage right information, with the second storage unit having a tamper-resistant configuration.

A fifth aspect of the present invention relates to a contents usage right information receiving device for receiving contents usage right information containing a contents key for decrypting and reproducing encrypted contents data from a contents usage right information providing device. The contents usage right information receiving device comprises: an interface for controlling transmission/reception of data to/from the content usage right information providing device; a first public key holding unit for holding a first public key set for the content usage right information receiving device; a first private key holding unit for holding a first private key for decrypting encrypted data which has been encrypted using the first public key; a second public key holding unit for holding a second public key set for the content usage right information receiving device; a second private key holding unit for holding a second private key for decrypting encrypted data which has been encrypted using the second public key; a symmetric key creating unit for creating a first symmetric key and a second symmetric key, each of which is a temporary key, at the time of reception of content usage right information from the content usage right information providing device; an encryption unit for encrypting data using a third symmetric key created by the content usage right information providing device; a first decryption unit for decrypting encrypted data, which has been encrypted using the first public key, using the first private key; a second decryption unit for decrypting data using the first symmetric key; a third decryption unit for decrypting encrypted data, which has been encrypted using the second public key, using the second private key; a fourth decryption unit for decrypting data using the second symmetric key; a fifth decryption unit for decrypting data using the fourth symmetric key created by the content usage right information providing device; a control unit, wherein the control unit outputs the first public key through the interface, the control unit receives the third symmetric key, which has been encrypted using the first public key, through the interface, the control unit instructs the symmetric key creating unit to create the first symmetric key and transmit the first symmetric key thus created to the encryption unit, the control unit receives the first symmetric key and the second public key, which have been encrypted using the third symmetric key decrypted by the first decryption unit, from the encryption unit, and outputs encrypted the first symmetric key and encrypted the second public key thus received through the interface, the control unit receives the fourth symmetric key, which has been encrypted using the second public key or the second symmetric key, through the interface, the control unit instructs the symmetric key creating unit to create the second symmetric key and transmit the second symmetric key thus created to the encryption unit, the control unit receives the second symmetric key, which has been encrypted using the fourth symmetric key or the third symmetric key decrypted by the second decryption unit or the third decryption unit, from the encryption unit, and outputs encrypted second symmetric key thus received through the interface, and the control unit receives encrypted content usage right information, which has been encrypted using the second symmetric key and the fourth symmetric key, through the interface.

When the control unit receives consecutively the content usage right information from the same content usage right information providing device, the control unit may instruct the symmetric key creating unit to create a new second symmetric key; the control unit may output the new second symmetric key, which has been encrypted by the encryption unit using either the first symmetric key or the fourth symmetric key, through the interface; and the control unit may receive encrypted content usage right information, which has been encrypted using the second symmetric key and the fourth symmetric key, through the interface.

The contents usage right information receiving device may further include a contents reproducing circuit for decrypting the encrypted contents data using a contents key contained in the contents usage right information, and reproducing the contents data thus decrypted. With such an arrangement, the contents reproducing device may include: a fourth decryption unit for decrypting the encrypted contents data using the contents usage right information key; and a reproducing unit for reproducing the contents data thus decrypted by the fourth decryption unit.

The contents usage right information receiving device may further include a storage unit for storing the encrypted contents data and the contents usage right information. With such an arrangement, the storage unit may include: a first storage unit for storing the encrypted contents data; and a second storage unit for storing the contents usage right information, with the second storage unit having a tamper-resistant configuration. The storage unit includes a non-transitory processor-readable medium, which embodies a set of processor-executable instructions. The execution of processor-executable instructions causes a processor to perform the above described functions of the content usage right information receiving/providing devices.

The features and technological significance of the present invention will become apparent from the following description of the embodiments. It should be clearly understood that the embodiments will be described for exemplary purposes only, and that the meanings of the technical terms given in this description of the present invention or the components thereof by way of embodiments are by no means intended to be interpreted restrictively.

DETAILED DESCRIPTION OF THE INVENTION

Description will be made below regarding embodiments according to the present invention with reference to the drawings.

First Embodiment

Figure 1:
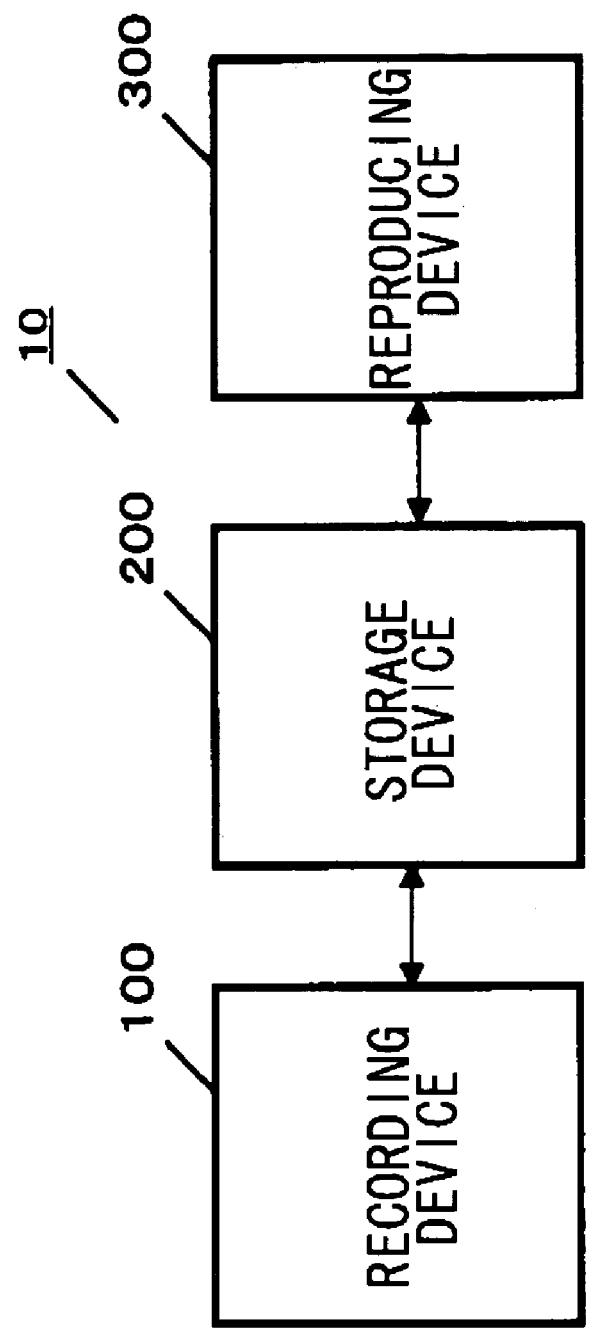
FIG. 1 is a diagram which shows an overall configuration of a data recording/reproducing device according to a first embodiment.

FIG. 1 shows an overall configuration of a data management system 10 according to a first embodiment. The data management system 10 includes: a recording device 100 for controlling recording of data on a storage device 200; a reproducing device 300 for controlling reproduction of the data recorded on the storage device 200; and the storage device 200 for storing and recording the data.

The term storage device 200 as used in the present embodiment does not represent a recording medium alone for storing data. Rather, the storage device 200 is a storage device formed of a combination of a recording medium and a drive. The storage device 200 includes a controller for controlling input/output of data between: a host device such as the recording device 100, the reproducing device 300, and so forth; and the recording medium. Description will be made in the present embodiment regarding an example employing a hard disk drive as the storage device 200.

In general, conventional hard disk drives are used in the state in which each hard disk drive is fixedly connected to a certain host device. On the other hand, the storage device 200 according to the present embodiment has a configuration which allows the user to detach the storage device 200 from a host device such as the recording device 100, the reproducing device 300, and so forth. That is to say, the user can detach the storage device 200 from the host device in the same way as with CD, DVD, and so forth. Thus, such a function allows sharing of the storage device 200 between multiple host devices such as the recording device 100, the reproducing device 300, a recording/reproducing device having both functions of recording and reproducing, and so forth.

As described above, the storage device 200 according to the present embodiment has a function of being shared between multiple host devices. This may lead a problem that the data stored in the storage device 200 is read out by a third party through an unauthorized host device.

Let us say that the storage device 200 stores contents such as audio contents, video contents, and so forth, protected by the copyright, or confidential information such as personal information, corporation data, and so forth. In order to prevent leakage of such kinds of confidential data, the storage device 200 preferably has an appropriate configuration for protecting the data, i.e., preferably has a sufficient tamper-resistant function.

From such a perspective, the storage device 200 according to the present embodiment has a configuration which allows exchange of confidential data in an encrypted form between the storage device 200 and the host device at the time of input/output of the confidential data therebetween. Furthermore, the storage device 200 has a confidential data storage area separate from an ordinary storage area, for storing confidential data. With such a configuration, no external circuit accesses the confidential data storage area except through an encryption engine included in the storage device 200. The encryption engine allows input/output of confidential data to/from a host device, only in a case that the host device has been verified as an authorized host device. Such a data protection function will also be referred to as "secure function" hereafter. The aforementioned configuration and function provides appropriate protection of the confidential data stored in the storage device 200.

The secure function of the storage device 200 is preferably designed so as to maintain the advantages of serving as a removable medium as much as possible. That is to say, the storage device 200 is preferably designed so as to allow input/output of ordinary data to/from a host device, even if the host device has no secure function. Accordingly, the storage device 200 according to the present embodiment is designed stipulated by ATA (AT attachment) which is a standard of ANSI (American National Standards Institute), thereby maintaining compatibility with conventional hard disks. That is to say, the aforementioned secure function is realized in the form of expanded commands of ATA.

Description will be made below regarding an example of input/output of confidential data in which the contents data such as video contents are recorded and reproduced. While the contents data may be handled as confidential data, description will be made below regarding an arrangement in which the contents data is encrypted, and the contents data thus encrypted is stored in the storage device 200 as ordinary data. With such a configuration, the system handles a key for decrypting the contents data thus encrypted (which will be referred to as "contents key" hereafter) and the data (which will be referred to as "license data") including information (which will be referred to as "user agreement" hereafter) regarding control for reproduction of the contents, and control for the usage, transmission, and duplication of the license, thereby enabling input/output using the aforementioned secure function. This enables input/output of data in a simple manner while maintaining sufficient tamper-resistant function, thereby enabling high-speed processing with reduced power consumption. Note that the license data includes a license ID for identifying the license data, and so forth, as well as the contents key and the user agreement.

Of commands issued by the host device such as the recording device 100, the reproducing device 300, and so forth, to the storage device 200, the expanded commands for the secure function will be referred to as "secure commands" hereafter. On the other hand, the other commands will also be referred to as "ordinary commands" hereafter.

Figure 2:
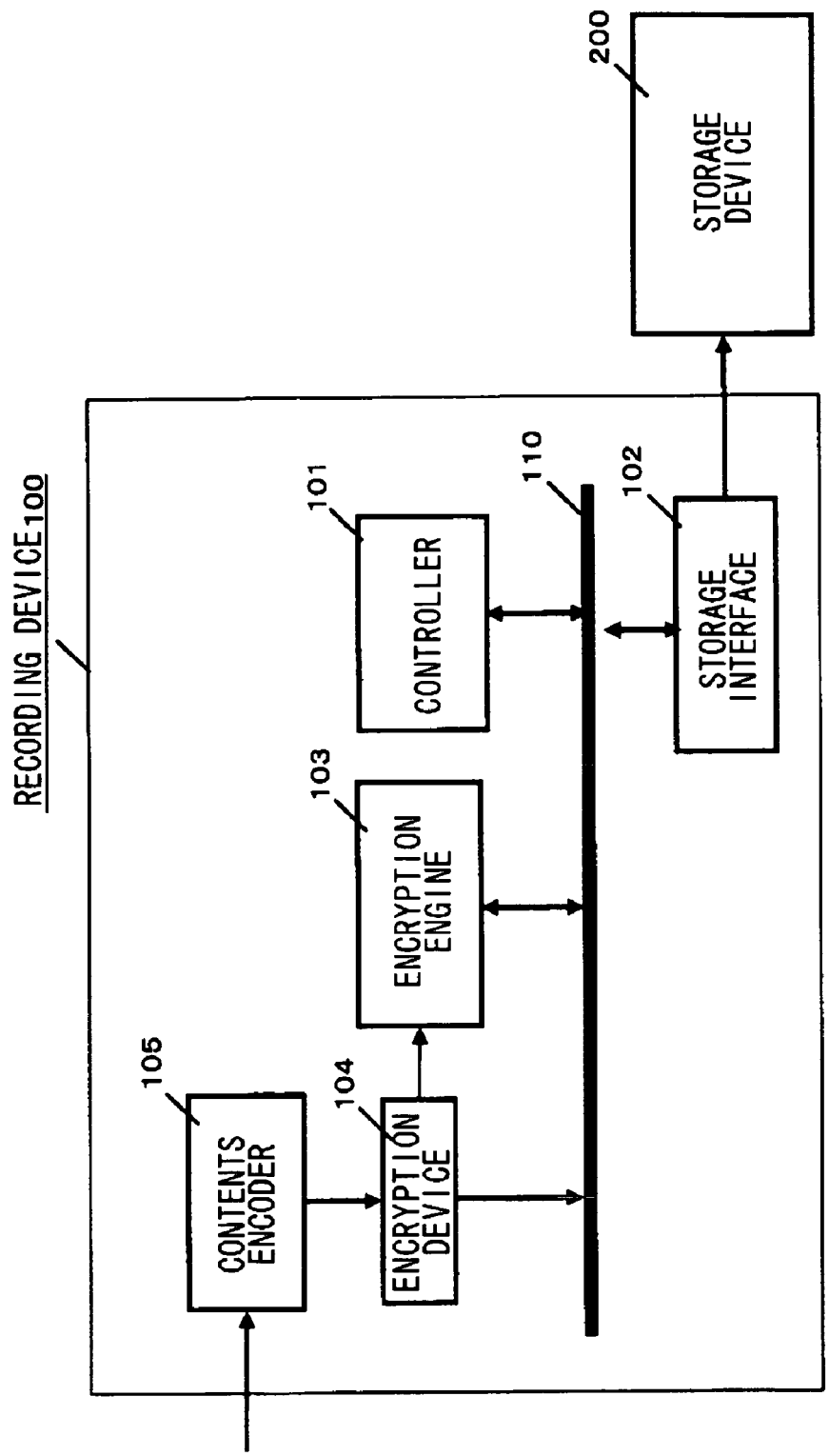
FIG. 2 is a diagram which shows an internal configuration of a recording device according to the first embodiment.

FIG. 2 shows an internal configuration of the recording device 100 according to an embodiment. Such a configuration may be realized by hardware means, e.g., by actions of a CPU, memory, and other LSIs, of a computer, and by software means, e.g., by actions of a program or the like, loaded to the memory. Here, the drawing shows a functional block configuration which is realized by cooperation of the hardware components and software components. It is needless to say that such a functional block configuration can be realized by hardware components alone, software components alone, or various combinations thereof, which can be readily conceived by those skilled in this art.

The recording device 100 principally includes a controller 101, a storage interface 102, an encryption engine 103, an encryption device 104, a contents encoder 105, and a data bus 110 for electrically connecting these components to each other.

The contents encoder 105 encodes the contents data acquired either on-line or off-line in a predetermined format. With the present embodiment, video data acquired from broadcast airwaves or the like is encoded in the MPEG format.

The encryption device 104 issues license data LIC containing a contents key for decrypting encrypted contents. The contents encoder 105 encrypts the contents data, which has been encoded by the contents encoder 105, using the contents key. The encrypted contents data is stored in the storage device 200 through the data bus 100 and the storage interface 102. Note that the encryption engine 103 is notified of the license data LIC thus issued, and the license data LIC is stored in the storage device 200 through the encryption engine 103.

The encryption engine 103 controls encrypted communication between the recording device 100 and the storage device 200, thereby allowing input of the license data LIC to the storage device 200. The storage interface 102 controls input/output of data to/from the storage device 200. The controller 101 centrally controls the components of the recording device 100.

Figure 3:
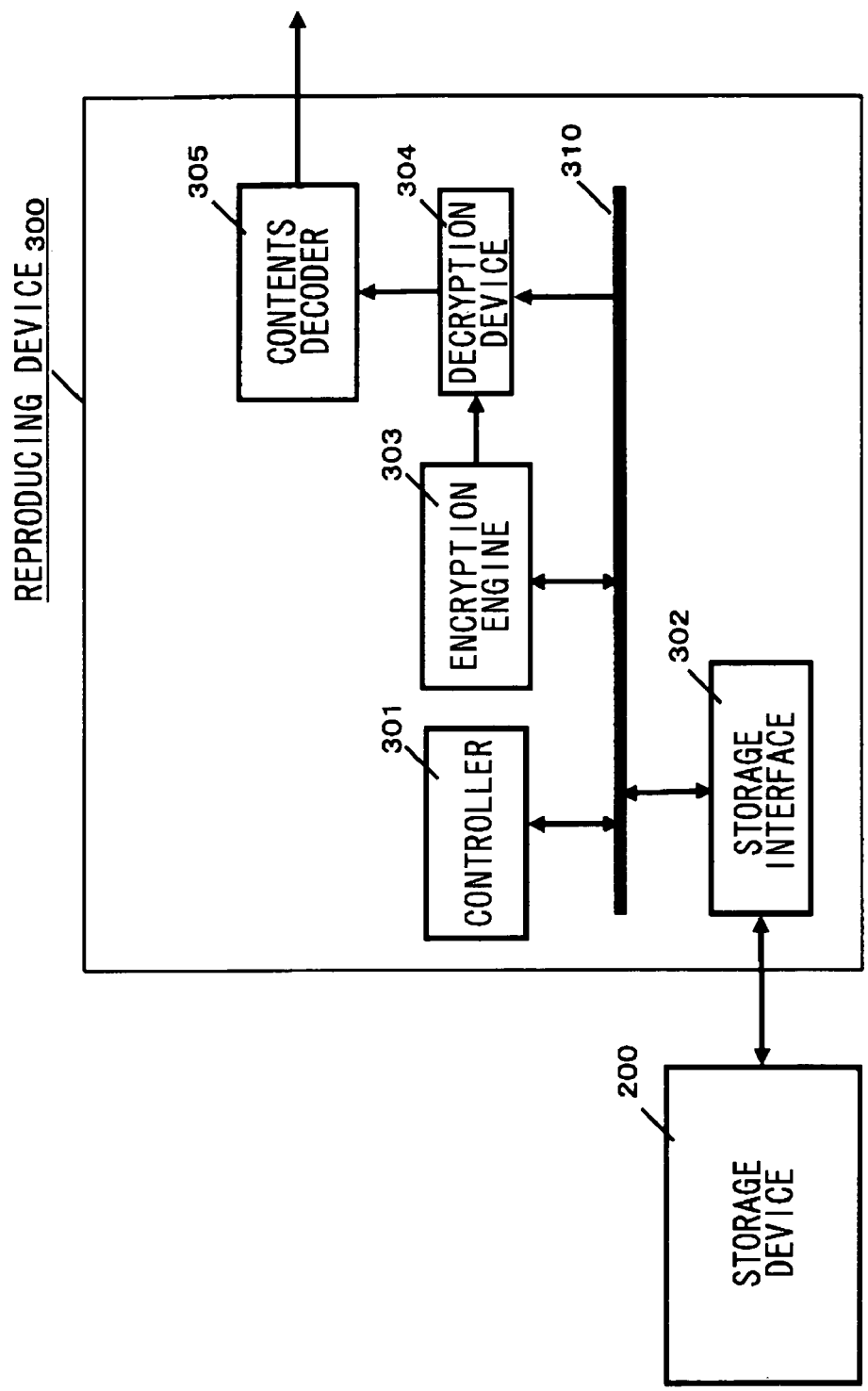
FIG. 3 is a diagram which shows an internal configuration of a reproducing device according to the first embodiment.

FIG. 3 shows an internal configuration of the reproducing device 300 according to the present embodiment. The aforementioned functional block configuration can be realized by hardware components alone, software components alone, or various combinations thereof.

The reproducing device 300 principally includes a controller 301, a storage interface 302, an encryption engine 303, a decryption device 304, a contents decoder 305, and a data bus 310 for connecting these components to each other.

The storage interface 302 controls input/output of data to/from the storage device 200. The encryption engine 303 controls encrypted communication between the storage device 200 and the reproducing device 300, thereby enabling reception of the license data LIC containing the contents key from the storage device 200.

The decryption device 304 decrypts the encrypted contents data read out from the storage device 200 using the contents key contained in the license data LIC received from the storage device 200.

The contents decoder 305 decodes the contents data decrypted by the decryption device 304, and outputs the decoded contents data. Let us say that the contents data is decoded in the MPEG format. In this case, the contents decoder 305 reproduces the video signal and the audio signal from the contents data. The video signal thus reproduced is displayed on an unshown display device. On the other hand, the audio signal thus reproduced is output to an unshown speaker. The controller 301 centrally controls the components of the reproducing device 300.

Figure 4:
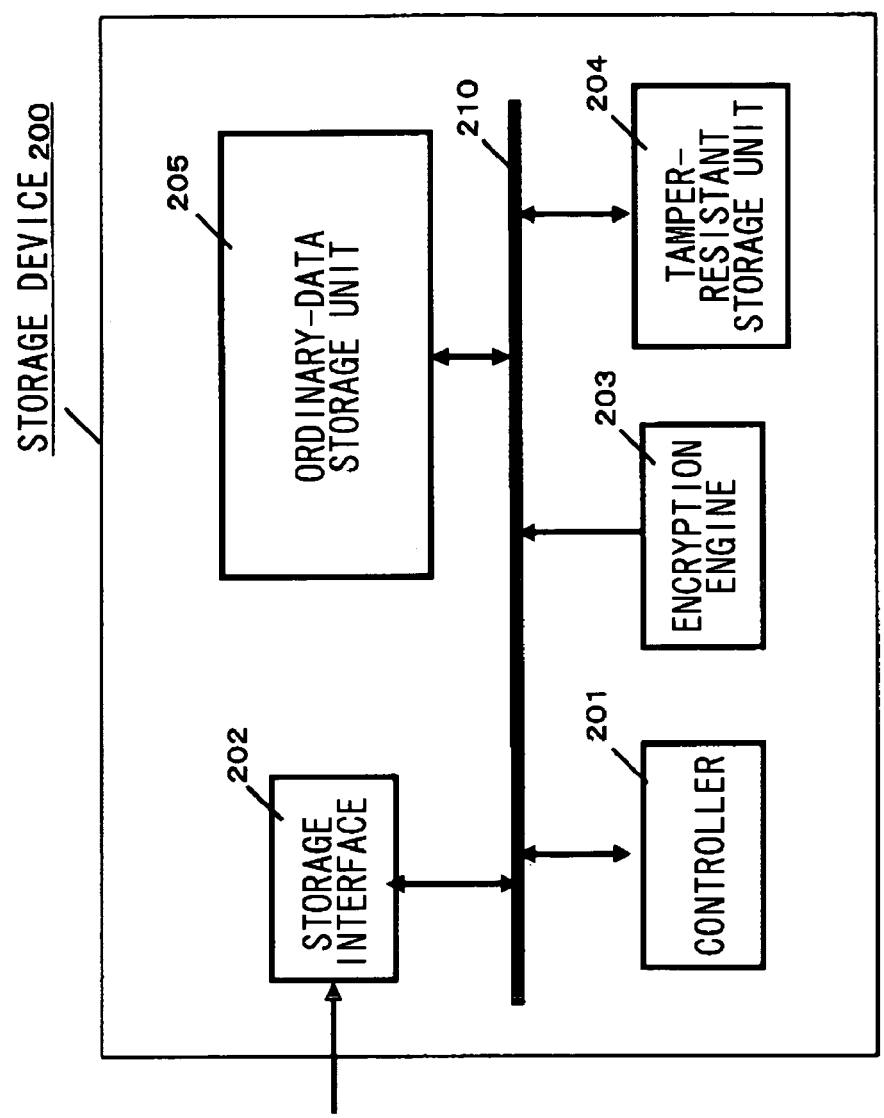
FIG. 4 is a diagram which shows an internal configuration of a storage device according to the first embodiment.

FIG. 4 shows an internal configuration of the storage device 200 according to the present embodiment. The storage device 200 principally includes a controller 200, a storage interface 202, an encryption engine 203, a tamper-resistant storage unit 204, an ordinary-data storage unit 205, and a data bus 210 for connecting these components to each other.

The storage interface 202 controls input/output of data to/from the storage device 100 and the reproducing device 300. The encryption engine 203 controls encrypted communication between: the storage device 200; and the recording device 100 and the reproducing device 300, thereby enabling input/output of confidential data such as the license data LIC containing the contents key to/from the recording device 100 and the reproducing device 300. The ordinary-data storage unit 205 serves as an ordinary-data storage area for storing the encrypted contents data, ordinary data, and so forth. On the other hand, the tamper-resistant storage unit 204 serves as a confidential-data storage area for storing confidential data such as the license data LIC containing the contents key. The ordinary-data storage unit 205 has a configuration which allows direct access from external circuits (input/output of data). On the other hand, the tamper-resistant storage unit 204 has a configuration which does not allow access from external circuits (input/output of data), except through the encryption engine 203. The controller 201 centrally controls these components of the storage device 200.

Now, description will be made regarding the keys employed in the present embodiment. In the present embodiment, all the keys are represented by text strings beginning with a capital K. On the other hand, the last letter of each text string, which represents the corresponding key, serves as an index for identifying the encryption engine from which the key has been provided. In the present embodiment, the key provided by specified encryption engines is represented by a text string in which the last letter is a numeral "1", "2", or "3". On the other hand, the keys provided by unspecified components other than the aforementioned encryption engines are represented by text strings in which the last letter is a letter of the English alphabet such as "x", "y", and so forth.

Challenge keys, which are symmetric keys (common keys) temporarily created by a data transmitter, are classified into two types based upon the timing of creation thereof. That is to say, the challenge key first created is represented by text string "Kfcy". On the other hand, the challenge key second created is represented by text string "Kscy". In the same way, session keys, which are symmetric keys temporarily created by a data receiver, are classified into two types based upon the timing of creation thereof. That is to say, the session key first created is represented by text string "Kfsx". On the other hand, the challenge key second created is represented by text string "Kssx".

Furthermore, the data receiver holds two pairs of keys. One key pair is formed of a public key KPdx, and a private key Kdx. This key pair is provided for each device group. Note that the public key KPdx is held in the form of a public-key certificate C [KPdx] (which will be simply referred to as "certificate" hereafter). The other key pair is formed of a public key KPpx, and a private key Kpx. This key pair is provided for each device. Furthermore, the system employs a verification key KPa for verifying the validity of the certificate C [KPdx]. Description will be made later regarding the usage of the verification key.

In the present embodiment, the key provided by the encryption engine 103 of the recording device 100 is represented by the index numeral "1". The key provided by the encryption engine 203 of the storage device 200 is represented by the index numeral "2". The key provided by the encryption engine 303 of the reproducing device 300 is represented by the index numeral "3".

Figure 5:
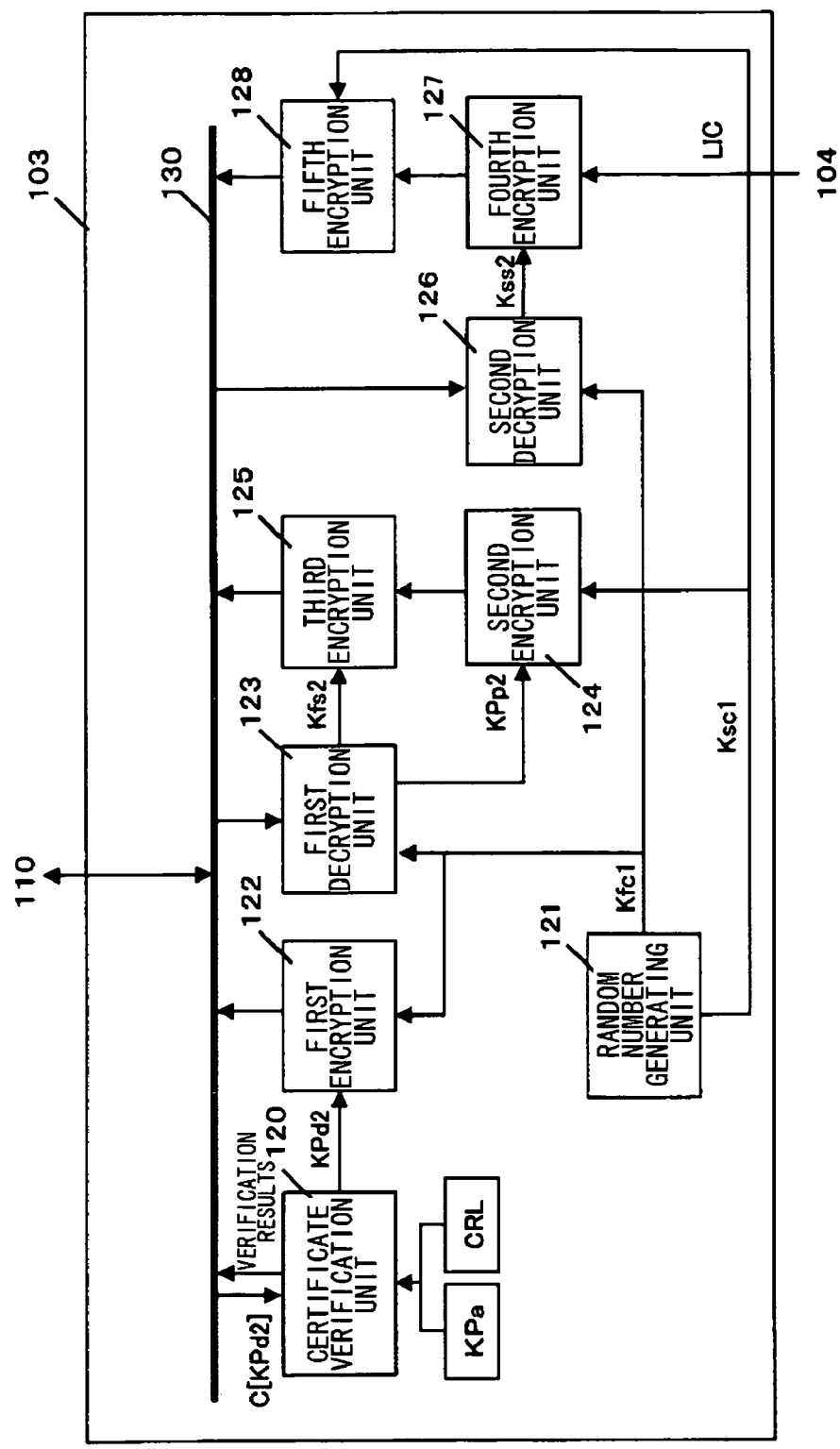
FIG. 5 is a diagram which shows an internal configuration of an encryption engine shown in FIG. 2.

FIG. 5 shows an internal configuration of the encryption engine 103 of the recording device 100 shown in FIG. 2. The encryption engine 103 includes a certification verification unit 120, a random number generating unit 121, a first encryption unit 122, a first decryption unit 123, a second encryption unit 124, a third encryption unit 125, a second decryption unit 126, a fourth encryption unit 127, a fifth encryption unit 128, and a local bus 130 for connecting at least a part of these components to each other.

The certificate verification unit 120 verifies the certificate C[KPd2] acquired from the storage device 200. The certificate C[KPd2] is formed of unencrypted information (which will be referred to as "certificate body" hereafter) containing the public key KPd2, and a digital signature appended to the certificate body. The digital signature is created as follows. That is to say, first, the certificate body is subjected to computation using the hash function (which will be referred to as "hash computation" hereafter). Next, the computation result thus obtained is encrypted using a root key Ka held by an Certificate Authority (not shown) which is a third party organization, thereby creating the digital signature. Note that the root key Ka is a non-public key which is strictly managed by the Certificate Authority. That is to say, the root key Ka is a private key of the Certificate Authority.

The certificate verification unit 120 holds a verification key KPa corresponding to the root key Ka; these two keys forming a key pair. The verification key KPa is a public key for verifying the validity of the certificate. The verification of the certificate is made based upon the validity of the certificate, which is to say that the certificate has not been forged, and that the certificate has not been revoked. That the certificate is not unauthorized is confirmed based upon comparison results between: the computation result obtained by performing hash function computation for the certificate body of the certificate which is to be verified; and the computation result obtained by decrypting the digital signature using the verification key KPa. In a case that these results match one another, the certificate verification unit 120 determines that the certificate is valid. Furthermore, the certificate verification unit 120 holds a certification revocation list which is a list of revoked certificates which accordingly have been invalidated. In a case that determination has been made that the certificate which is to be verified is not listed in the CRL, the certificate verification unit 120 determines that the certificate is valid. In the present embodiment, such processing, in which a certificate is authenticated and authorized based upon the validity of the certificate, will be referred to as "verification".

Upon success of verification, the certificate verification unit 120 acquires the public key KPd2 of the storage device 200. Then, the certificate verification unit 120 transmits the public key KPd2 to the first encryption unit 122, as well as making notification of the verification results. In a case of failure in verification, the certificate verification unit 120 outputs a verification error notification.

The random number generating unit 121 generates challenge keys Kfc1 and Ksc1 temporarily used for encrypted communication between the recording device 100 and the storage device 200. The random number generating unit 121 generates the challenge keys Kfc1 and Ksc1 each time that encrypted communication is performed, thereby minimizing the risk of the challenge key being cracked. The generated challenge key Kfc1 is transmitted to the first encryption unit 122, the first decryption unit 123, and the second decryption unit 126. On the other hand, the challenge key Ksc1 is transmitted to the second encryption unit 124 and the fifth encryption unit 128.

In order to notify the storage device 200 of the challenge key Kfc1, the first encryption unit 122 encrypts the challenge key Kfc1 using the public key KPd2 of the storage device 200 acquired by the certificate verification unit 120, thereby creating first challenge information E(KPd2, Kfc1).

The first decryption unit 123 decrypts the encrypted data using the challenge key Kfc1. A session key Kfs2 issued by the storage device 200 and a public key KPp2 of the storage device 200 are supplied from the storage device 200 in the form of first session information E(Kfc1, Kfs2//KPp2). With the present embodiment, the first decryption unit 123 decrypts the first session information using the challenge key Kfc1 generated by the random number generating unit 121, thereby acquiring the session key Kfs2 and the public key KPp2. The acquired public key KPp2 is transmitted to the second encryption unit 124. On the other hand, the session key Kfs2 is transmitted to the third encryption unit 125. Here, the symbol "//" represents data linking. For example, Expression "Kfs2//KPp2" represents a data sequence in which the session key Kfs2 and the public key KPp2 are serially linked with each other. On the other hand, the symbol "E" represents an encryption function. For example, Expression E(Kfc1, Kfs2//KPp2) represents a function for encrypting the data sequence Kfs2//KPp2 using the challenge key Kfc1.

In order to notify the storage device 200 of the challenge key Ksc1, the second encryption unit 124 encrypts the challenge key Ksc1 using the public key KPp2 of the storage device 200 acquired by the first decryption unit 123, thereby creating an encrypted challenge key E(KPp2, Ksc1). Then, the encrypted challenge key E(KPp2, Ksc1) is transmitted to the third encryption unit 125.

The third encryption unit 125 further encrypts E(KPp2, Ksc1) transmitted from the second encryption unit 124 using the session key Kfs2, thereby creating a second challenge information E(Kfs2, E(KPp2, Ksc1)).

The second decryption unit 126 decrypts the encrypted data using the challenge key Kfc1. A session key Kss2 issued by the storage device 200 is supplied from the storage device 200 in the form of second session information E(Kfc1, Kss2). With the present embodiment, the second decryption unit 126 decrypts the second session information using the challenge key Kfc1 generated by the random number generating unit 121, thereby acquiring the session key Kss2. The acquired session key Kss2 is transmitted to the fourth encryption unit 127.

The fourth encryption unit 127 acquires the license data LIC containing the contents key issued in the processing in which the encryption device 104 encrypts the contents. Then, the fourth encryption unit 127 encrypts the license data LIC using the session key Kss2 issued by the storage device 200 which is a receiver of the license data, thereby creating E(Kss2, LIC). Subsequently, E(Kss2, LIC) is transmitted to the fifth encryption unit 128.

The fifth encryption unit 128 further encrypts E(Kss2, LIC) transmitted from the fourth encryption unit 127 using the challenge key Ksc1 issued by the recording device 100, thereby creating encrypted license data E(Ksc1, E(Kss2, LIC)).

As shown in FIG. 5, of the components forming the encryption engine 103, the certificate verification unit 120, the first encryption unit 122, the first decryption unit 123, the third encryption unit 125, and the fifth encryption unit 128, are electrically connected with each other through the local bus 130, and further connected to the data bus 110 of the recording device 100 through the local bus 130. While various modifications may be made for connecting these components, connection of these components according to the present embodiment is designed such that the challenge keys Kfc1 and Ksc1 generated by the random generating unit 121 and the session keys Kfs2 and Kss2 received from the storage device 200 are not directly available on the data bus 110. This prevents leakage of each key used in the encryption engine 103 to external circuits through other components of the recording device 100, thereby improving security.

Figure 6:
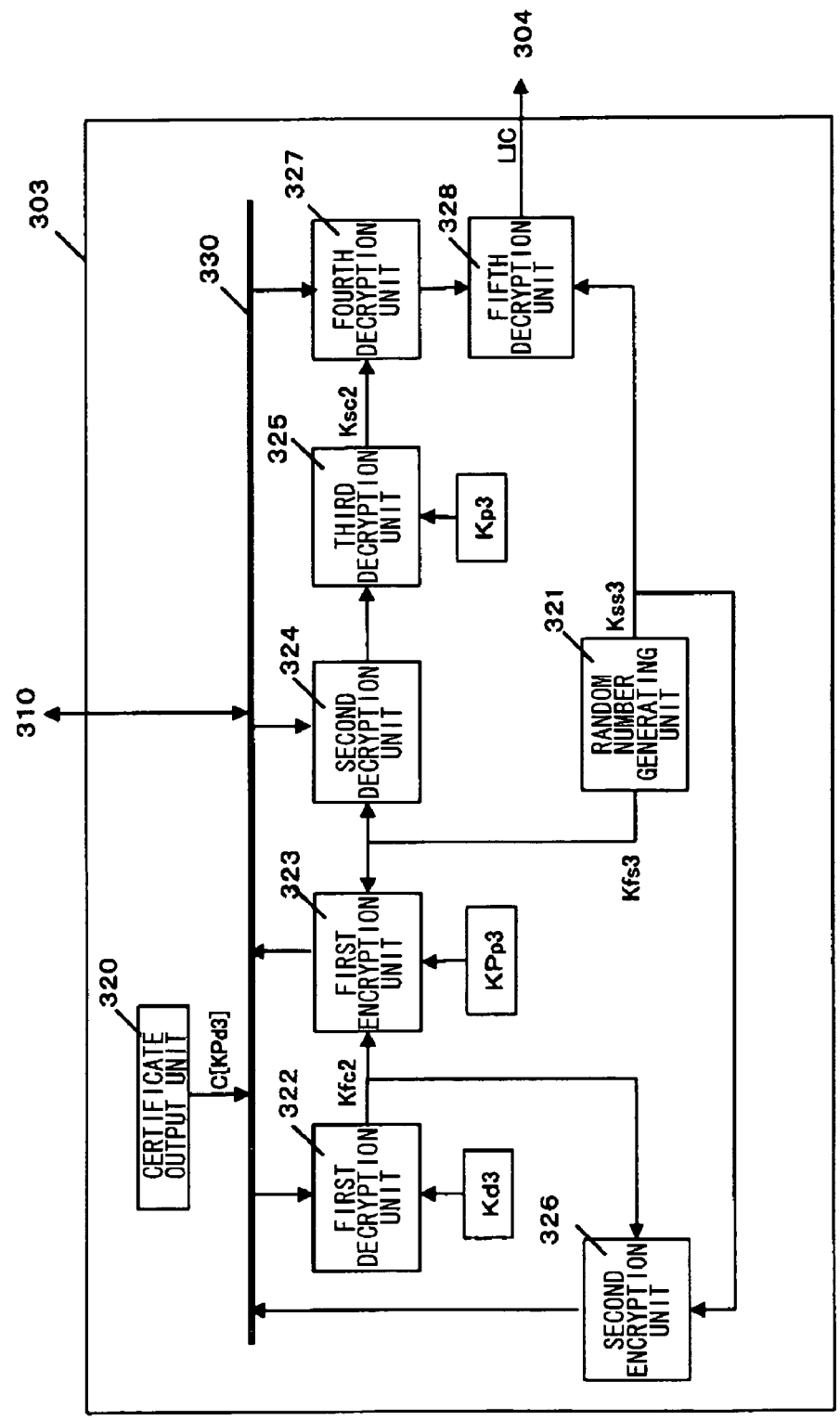
FIG. 6 is a diagram which shows an internal configuration of an encryption engine shown in FIG. 3.

FIG. 6 shows an internal configuration of the encryption engine 303 of the reproducing device 300 shown in FIG. 3. The encryption engine 303 includes: a certificate output unit 320, a random number generating unit 321, a first decryption unit 322, a first encryption unit 323, a second decryption unit 324, a third decryption unit 325, a second encryption unit 326, a fourth decryption unit 327, a fifth decryption unit 328, and a local bus 330 for electrically connecting at least part of these components.

The certificate output unit 320 outputs a certificate C[KPd3] of the reproducing device 300. The certificate may be held by the certificate output unit 320. Also, an arrangement may be made in which an unshown certificate holding unit holds the certificate, and the certificate output unit 320 reads out the certificate from the certificate holding unit as necessary. The certificate is formed of the certificate body containing a public key KPd3 of the reproducing device 300 and a digital signature appended to the certificate body. The digital signature is encrypted using the root key Ka of the Certificate Authority in the same way as with the certificate of the storage device 200.

The random number generating unit 321 generates session keys Kfs3 and Kss3 temporarily used for encrypted communication between the reproducing device 300 and the storage device 200. The created session key Kfs3 is transmitted to the first encryption unit 323 and the second decryption unit 324. On the other hand, the created session key Kss3 is transmitted to the second encryption unit 326 and the fifth decryption unit 328.

The first decryption unit 322 decrypts the data, which has been encrypted using the public key KPd3, using a private key Kd3. In reproduction processing, a challenge key Kfc2 issued by the storage device 200 is encrypted using the public key KPd3 of the reproducing device 300, and the challenge key Kfc2 thus encrypted is supplied from the storage device 200. With the present embodiment, the first decryption unit 322 decrypts the encrypted challenge key Kfc2 using the private key Kd3 thereof, thereby acquiring the challenge key Kfc2. The challenge key Kfc2 thus acquired is transmitted to the first encryption unit 323 and the second encryption unit 326.

The first encryption unit 323 encrypts data using the challenge key Kfc2 acquired by the first decryption unit 322. Specifically, in order to notify the storage device 200 of the session key Kfs3 and the public key KPp3 of the reproducing device 300, the first encryption unit 323 performs encryption processing as follows. That is to say, the first encryption unit 323 links the session key Kfs3 generated by the random number generating unit 321 and the public key KPp3 of the reproducing device 300, and encrypts the linked key data, thereby creating first session information E(Kfc2, Kfs3//KPp3).

The second decryption unit 324 decrypts the encrypted data using the session key Kfs3. The challenge key Ksc2 issued by the storage device 200 is supplied from the storage device 200 in the form of a second challenge information E(Kfs3, E(KPp3, Ksc2)), which is information encrypted twofold using the public key KPp3 and the session key Kfs3. With the present embodiment, the second decryption unit 324 decrypts the second challenge information using the session key Kfs3, and transmits the decryption results to the third decryption unit 325.

The third decryption unit 325 decrypts the data which has been encrypted using the public key KPp3. That is to say, the third decryption unit 325 decrypts the decryption results transmitted from the second decryption unit 324, using the private key Kp3 corresponding to the public key KPp3; these keys forming a key pair. Thus, the challenge key Ksc2 is acquired. The challenge key Ksc2 thus acquired is transmitted to the fourth decryption unit 327.

The second encryption unit 326 encrypts data using the challenge key Kfc2 acquired by the first decryption unit 322. With the present embodiment, in order to notify the storage device 200 of the session key Kss3, the session key Kss3 generated by the random number generating unit 321 is encrypted, thereby creating a second session information E(Kfc2, Kss3). Note that a new session key Kss3 is generated by the random number generating unit 321 for each transmission of the license data.

The fourth decryption unit 327 decrypts data using the challenge key Ksc2. The license data LIC is transmitted from the storage device 200 in the form of a double-encrypted license data E(Ksc2, E(Kss3, IIC)) which has been encrypted twofold using the challenge keys Ksc2 and Kss3. With the present embodiment, the fourth decryption unit 327 decrypts the encrypted license data using the challenge key Ksc2 issued by the storage device 200, and transmits the decryption results to the fifth decryption unit 328.

The fifth decryption unit 328 decrypts the encrypted data using the session key Kss3. Specifically, the fifth decryption unit 328 decrypts the decryption results transmitted from the fourth decryption unit 327, and acquires the licenses data LIC. The license data LIC thus acquired is transmitted to the decryption device 304. Then, the decryption device 304 decrypts the encrypted contents data using the contents key contained in the license data LIC.

While various modifications may be made for connecting these components of the encryption engine 303 shown in FIG. 6, connection of these components according to the present embodiment is designed such that the session keys Kfs3 and Kss3 which have been generated by the random number generating unit 321, the private keys Kd3 and Kp3 each of which forms a key pair along with the corresponding public key, and the challenge keys Kfc2 and Ksc2 received from the storage device 200, are not directly available on the data bus 310 through the local bus 330. This prevents leakage of the decryption keys used in the encryption engine 303 to external circuits.

Figure 7:
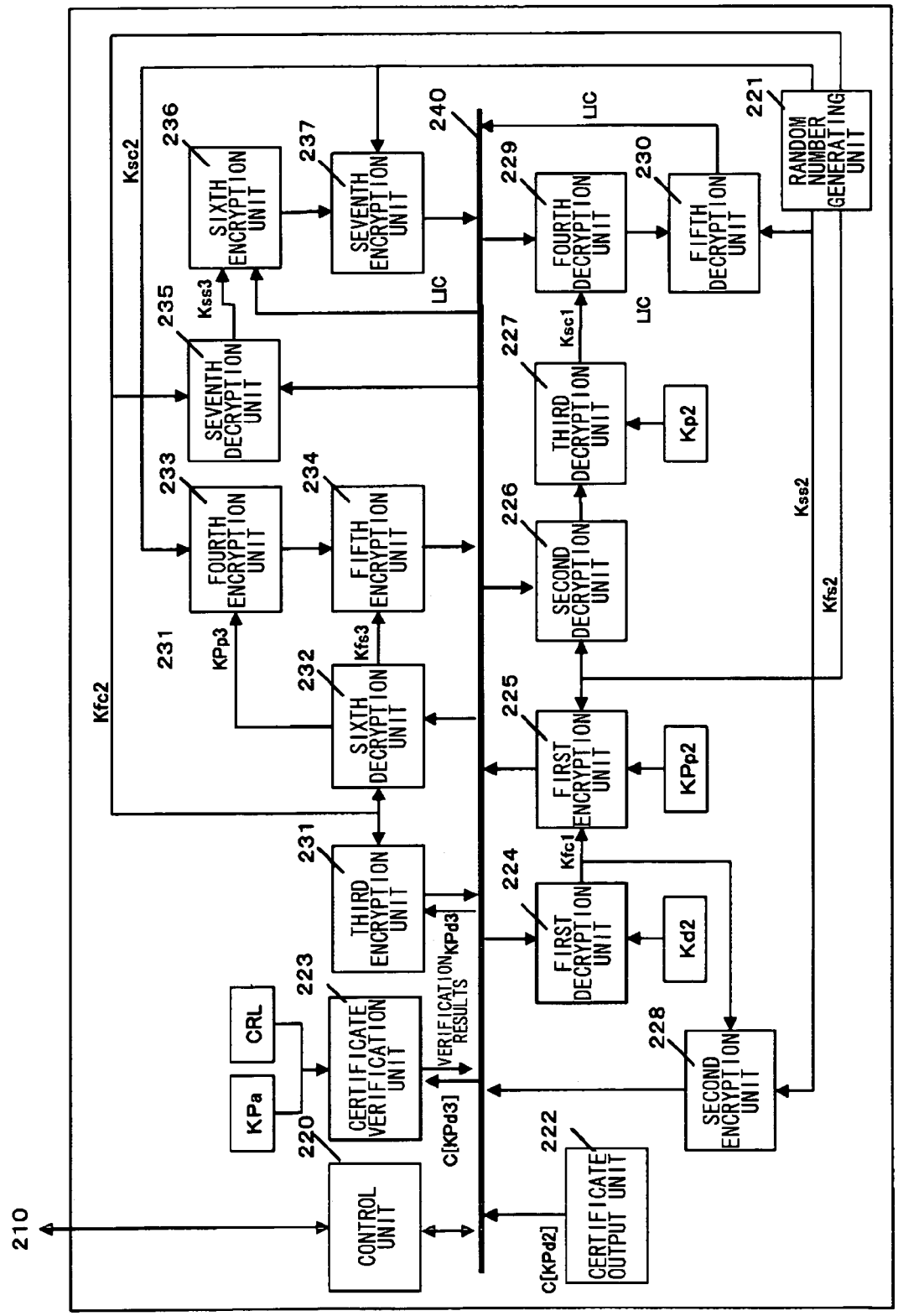
FIG. 7 is a diagram which shows an internal configuration of an encryption engine shown in FIG. 4.

FIG. 7 shows an internal configuration of the encryption engine 203 of the storage device 200 shown in FIG. 4. The aforementioned functional block configuration can also be realized by hardware components alone, software components alone, or various combinations thereof. With the present embodiment, the encryption engine 203 includes a control unit 220, a random number generating unit 221, a certificate output unit 222, a certificate verification unit 223, a first decryption unit 224, a first encryption unit 225, a second decryption unit 226, a third decryption unit 227, a second encryption unit 228, a fourth decryption unit 229, a fifth decryption unit 230, a third encryption unit 231, a sixth decryption unit 232, a fourth encryption unit 233, a fifth encryption unit 234, a seventh decryption unit 235, a sixth encryption unit 236, a seventh encryption unit 237, and a local bus 240 for electrically connecting at least a part of these components.

The control unit 220 controls the internal components of the encryption engine 203 and controls input/output of data to/from external components according to instructions from the controller 201 of the storage device 200.

The random number generating unit 221 generates the session keys Kfs2 and Kss2, and the challenge keys Kfc2 and Ksc2, temporarily used for encrypted communication between the storage device 200 and either of the storage device 100 or the reproducing device 300. Specifically, in a case that the storage device 200 provides the license data, the random number generating unit 221 generates the two challenge keys Kfc2 and Ksc2. On the other hand, in a case that the storage device 200 stores the license data therein, the random number generating unit 211 generates the two session keys Kfs2 and Kss2.

The certificate output unit 222 outputs the certificate C[KPd2] of the storage device 200. The certificate may be held by the certificate output unit 222. Also, an arrangement may be made in which the certificate is stored in a predetermined storage area in the storage device 200, e.g., the tamper-resistant storage unit 204, and the certificate output unit 222 reads out the certificate therefrom as necessary. The certificate is formed of the certificate body containing a public key KPd2 of the storage device 200 and a digital signature appended to the certificate body. The digital signature is encrypted using the root key Ka of the Certificate Authority.

The certificate verification unit 223 verifies the certificate provided from external components. Specifically, the certificate verification unit 223 verifies the certificate C[KPd3] acquired from the reproducing device 300 using the verification key KPa. Note that detailed description has been made regarding verification processing, and accordingly, description thereof will be omitted.

The first decryption unit 224 decrypts the data, which has been encrypted using the public key KPd2 of the storage unit 200. Specifically, in a case of recording the data, the challenge key Kfc1 issued by the recording device 100 is encrypted using the public key KPd2 of the storage device 200. With the present embodiment, the first decryption unit 224 decrypts the first challenge information using the private key Kd2 of the storage device 200, thereby acquiring the challenge key Kfc1. The challenge key Kfc1 thus acquired is transmitted to the first encryption unit 225 and the second encryption unit 228.

The first encryption unit 225 encrypts data using the challenge key Kfc1 issued by the recording device 100. Specifically, the first encryption unit 225 links the session key Kfs2 generated by the random number generating unit 221 and the public key KPp2 of the storage device 200, and encrypts the linked key data using the challenge key Kfc1. Thus, the first encryption unit 225 creates first session information E(Kfc1, Kfs2//KPp2).

The second decryption unit 226 decrypts the encrypted data using the session key Kfs2 generated by the random number generating unit 221. Specifically, the second decryption unit 226 receives the challenge key Ksc1 from the recording device 100 in the form of the second challenge information E(Kfs2, E(KPp2, Ksc1)) which has been encrypted twofold using the public key KPp2 and the session key Kfs2. With the present embodiment, the second decryption unit 226 decrypts the encrypted data using the session key Kfs2, and transmits the decryption results to the third decryption unit 227.

The third decryption unit 227 decrypts the data which has been encrypted using the public key KPp2 of the storage device 200. Specifically, the third decryption unit 227 decrypts the encrypted challenge key E(KPp2, Ksc1), which has been encrypted using the public key KPp2 and which has been transmitted from the second decryption unit 226, using the private key Kp2 of the storage device 200; these keys forming a key pair. Thus, the third decryption unit 227 acquires the challenge key Ksc1. The challenge key Ksc1 thus acquired is transmitted to the fourth decryption unit 229.

The second encryption unit 228 encrypts the data using the challenge key Kfc1 issued by the recording device 100. Specifically, the second encryption unit 228 encrypts the session key Kss2 generated by the random number generating unit 221, thereby creating the second session information E(Kfc1, Kss2).

The fourth decryption unit 229 decrypts the encrypted data using the challenge key Ksc1 issued by the recording device 100. Specifically, the fourth decryption unit 229 receives the license data LIC from the recording device 100 in the form of the double-encrypted license data E(Ksc1, E(Kss2, LIC)), in which the license data LIC has been encrypted twofold using the challenge key Ksc1 and the session key Kss2. With the present embodiment, the fourth decryption unit 229 decrypts the double-encrypted license data using the challenge key Ksc1, and transmits the decryption results to the fifth decryption unit 230.

The fifth decryption unit 230 decrypts the encrypted data using the session key Kss2 generated by the random number generating unit 221. Specifically, the fifth decryption unit 230 decrypts the encrypted license data E(Kss2, LIC) using the session key Kss2 transmitted from the fourth decryption unit 229, thereby acquiring the license data LIC.

The license data LIC thus acquired is supplied to the data bus 210 through the local bus 240 and the control unit 220, and stored in the tamper-resistant storage unit 204 according to instructions from the controller 201.

The third encryption unit 231 encrypts the data using the public key KPd3 of the reproducing device 300. Specifically, in a case of supplying the license data to the reproducing device 300, the third encryption unit 231 encrypts the challenge key Kfc2, which has been generated by the random number generating unit 221, using the public key KPd3 acquired from the certificate C[KPd3] received from the reproducing device 300. Thus, the third encryption unit 231 creates first challenge information E(KPd3, Kfc2).

The sixth decryption unit 232 decrypts the data using the challenge key Kfc2 generated by the random number generating unit 221. Specifically, the sixth decryption unit 232 decrypts the first session information E(Kfc2, Kfs3//KPp3) received from the reproducing device 300, using the challenge key Kfc2 generated by the random number generating unit 221, thereby acquiring the session key Kfs3 and the public key KPp3 of the reproducing device 300. The session key Kfs3 and the public key KPp3 thus acquired are transmitted to the fifth encryption unit 234 and the fourth encryption unit 233, respectively.

The fourth encryption unit 233 encrypts the data using the public key KPp3 of the reproducing device 300. In a case of supplying the license data to the reproducing device 300, the fourth encryption unit 233 encrypts the challenge key Ksc2 generated by the random number generating unit 221, using the public key KPp3 received from the reproducing device 300.

The fifth encryption unit 234 encrypts the data using the session key Kfs3 issued by the reproducing device 300. Specifically, the fifth encryption unit 234 further encrypts the encrypted challenge key E(KPp3, Ksc2), which has been encrypted by the fourth encryption unit 233 using the public key KPp3 of the reproducing device 300, using the session key Kfs3. Thus, the fifth encryption unit 234 creates first session information E(Kfs3, E(KPp3, Ksc2)).

The seventh decryption unit 235 decrypts the encrypted data using the challenge key Kfc2 issued by the random number generating unit 221. Specifically, the seventh decryption unit 235 decrypts the second session information E(Kfc2, Kss3) received from the reproducing device 300, using the challenge key Kfc2 issued by the random number generating unit 221, thereby acquiring the session key Kss3. The session key Kss3 thus acquired is transmitted to the sixth encryption unit 236. Note that a new session key Kss3 is generated by the reproducing device 300 for each transmission of license data.

The sixth encryption unit 236 encrypts the data using the session key Kss3 issued by the reproducing device 300. Specifically, in a case of supplying the license data to the reproducing device 300, the sixth encryption unit 236 encrypts the license data LIC using the newest session key Kss3 received from the reproducing device 300. Note that the license data LIC is read out from the tamper-resistant storage unit 204, and is supplied to the sixth encryption unit 236 beforehand through the data bus 210, the control unit 220, and the local bus 240, according to instructions from the controller 201.

The seventh encryption unit 237 encrypts the data using the challenge key Ksc2 generated by the random number generating unit 221. Specifically, the seventh encryption unit 237 further encrypts the encrypted license data, which has been encrypted by the sixth encryption unit 236 using the session key Kss3 issued by the reproducing unit 300, using the challenge key Ksc2. Thus, the seventh encryption unit 237 creates the encrypted license data E(Ksc2, E(Kss3, LIC)).

Figure 8:
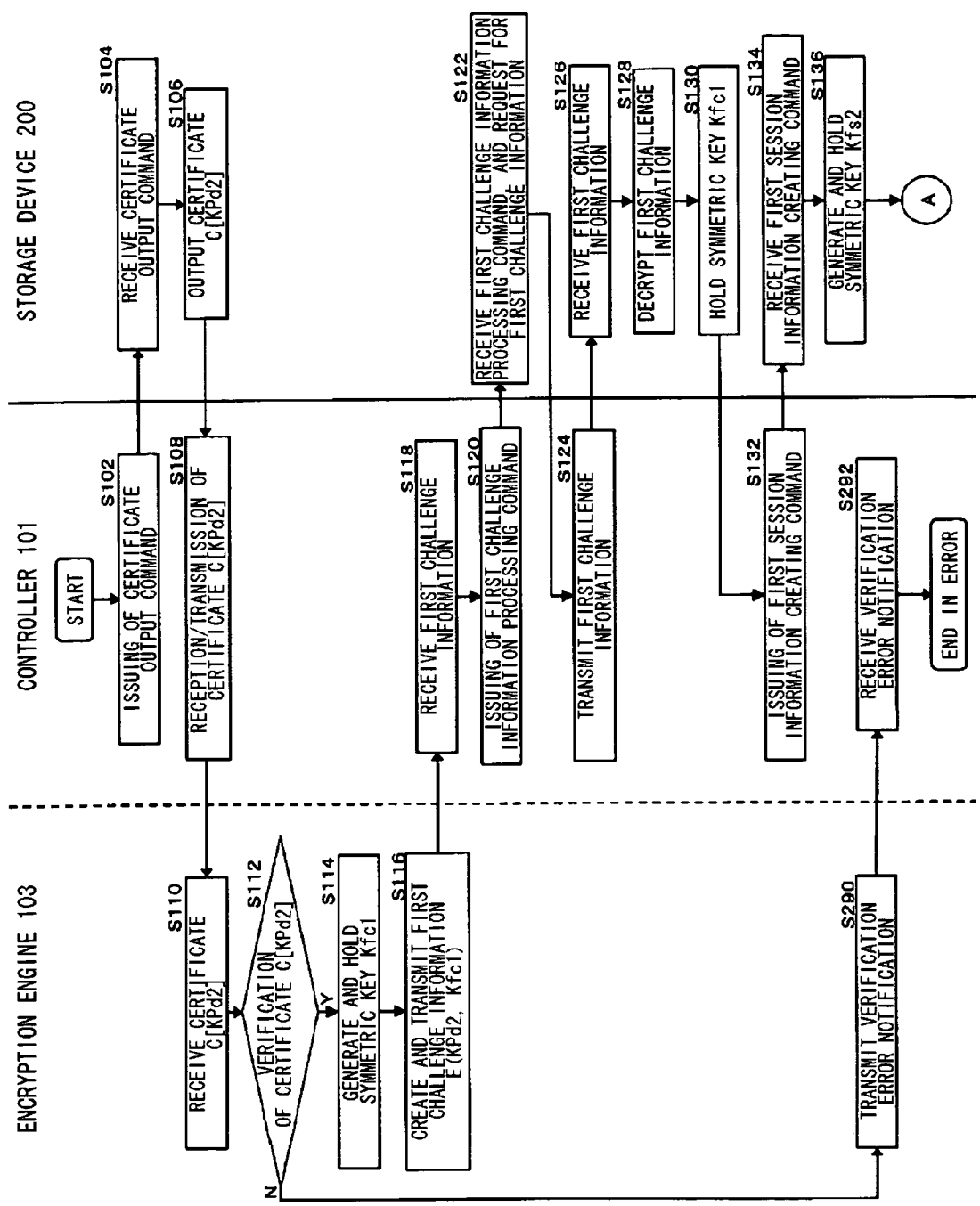
FIG. 8 is a diagram which shows a procedure up to a step in which the recording device stored license data in the storage device.
Figure 9:
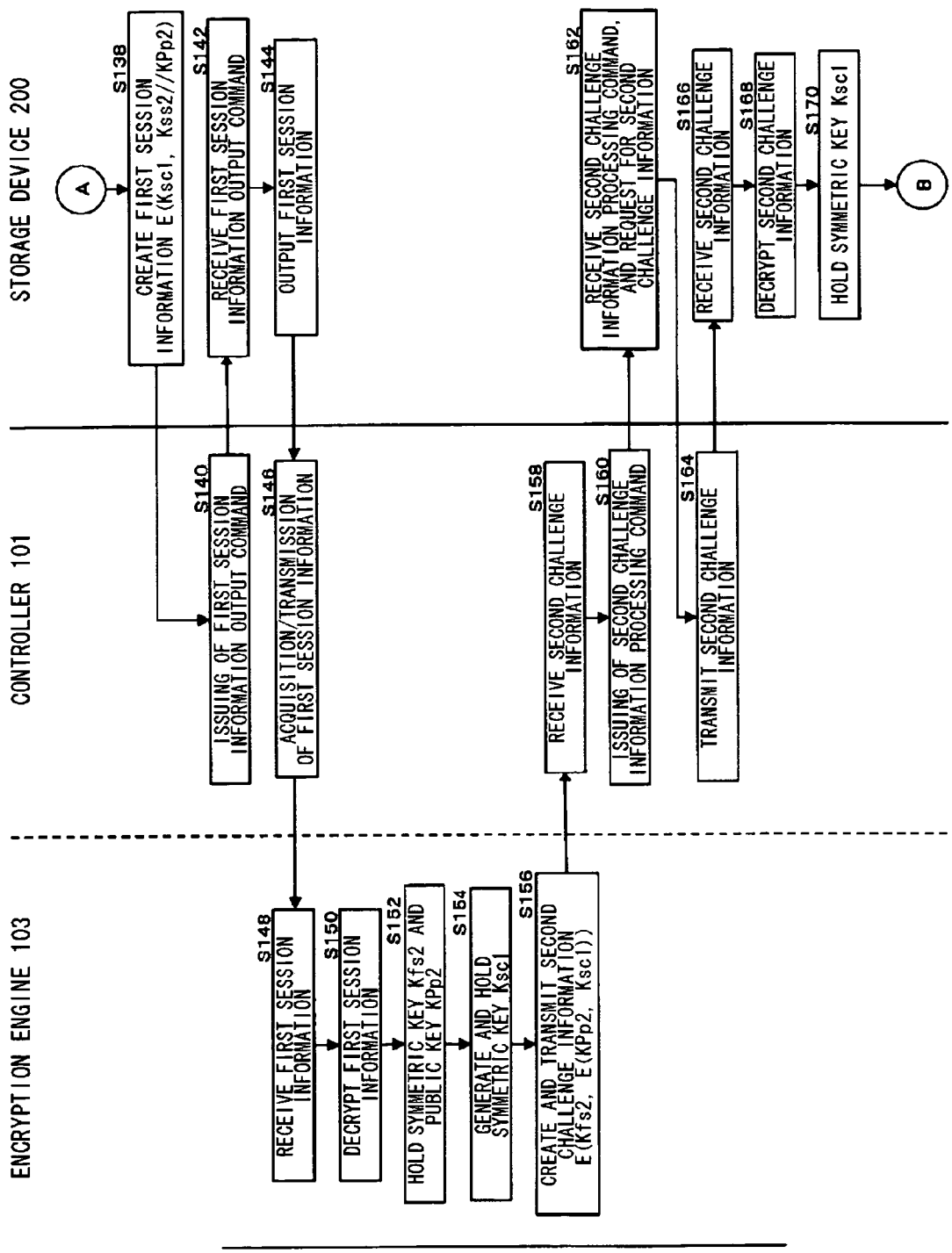
FIG. 9 is a diagram which shows a procedure up to a step in which the recording device stores license data in the storage device.
Figure 10:
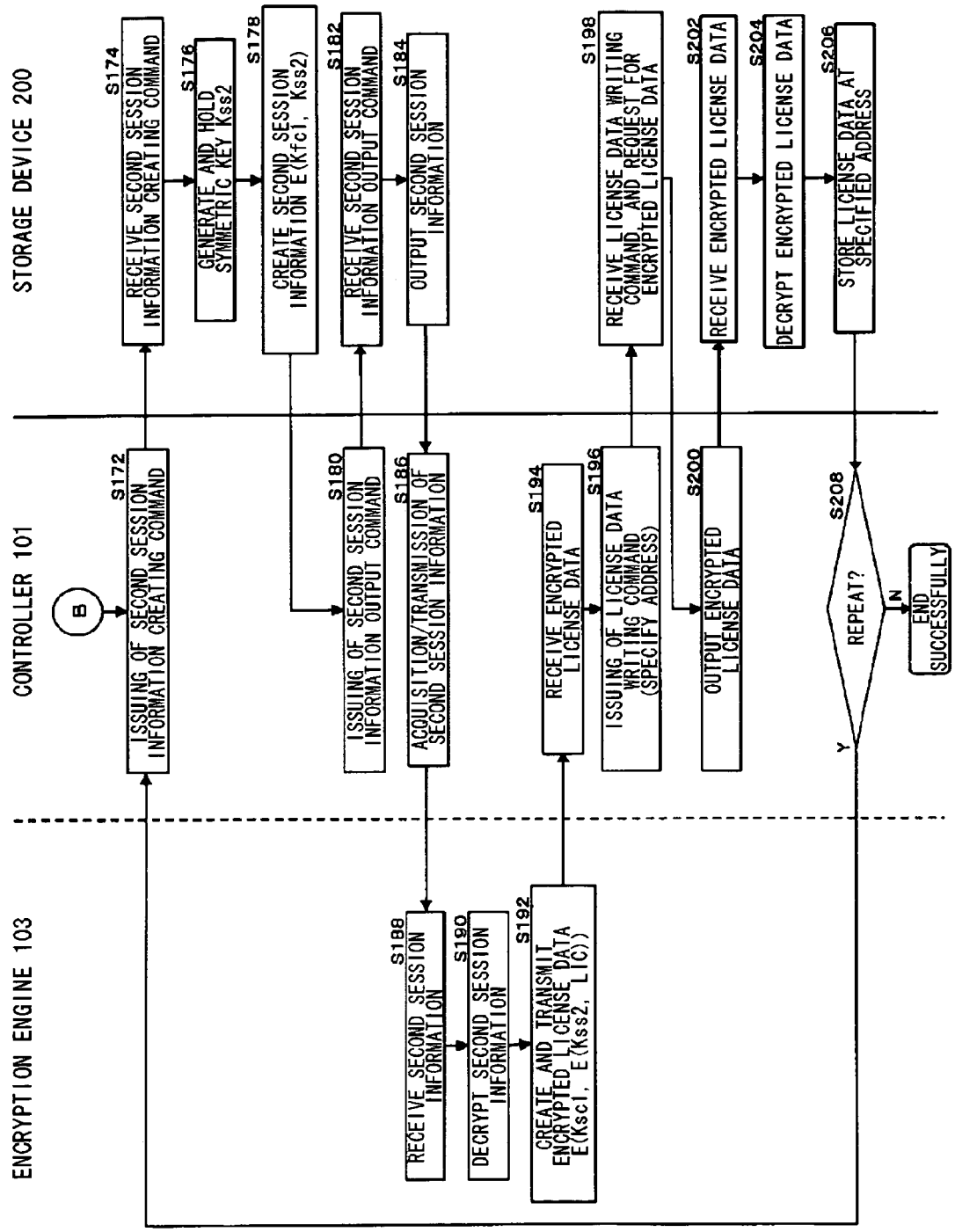
FIG. 10 is a diagram which shows a procedure up to a step in which the recording device stores license data in the storage device.

FIGS. 8, 9, and 10 show the procedure of the recording device 100 for recording the license data on the storage device 200.

First, the controller 101 of the recording device 100 issues a certificate output command to the storage device 200 (S102). Upon successful reception of the certificate output command (S104), the controller 201 of the storage device 200 instructs the encryption engine 203 to output the certificate. Then, the controller 201 outputs the certificate C[KPd2] thus read out, to the recording device 100 (S106).

Upon reception of the certificate C[KPd2] from the storage device 200, the controller 101 of the recording device 100 transmits the certificate to the encryption engine 103 of the recording device 100 (S108). Upon the encryption engine 103 receiving the certificate C[KPd2] of the storage device 200 (S110), the certificate verification unit 120 verifies the certificate using the verification key KPa (S112). In a case that the certificate has not been authenticated (in a case of "NO" in S112), the certificate verification unit 120 transmits a verification-error notification to the controller 101 (S290). In a case that the controller 101 has received an error notification (S292), the processing ends in error.

In a case that the certificate has been authenticated (in a case of "YES" in S112), the encryption engine 103 generates the challenge key Kfc1 by actions of the random number generating unit 121, and transmits the challenge key Kfc1 thus generated, to the first encryption unit 122 and the first decryption unit 123. The first decryption unit 123 holds the challenge key Kfc1 therein (S114). The first encryption unit 122 encrypts the challenge key Kfc1 using the public key KPd2 of the storage device 200, thereby creating the first challenge information E(KPd2, Kfc1). Then, the first encryption unit 122 transmits the first challenge information to the controller 101 (S116).

Upon reception of the first challenge information E(KPd2, Kfc1) (S118), the controller 101 issues a first challenge information processing command to the storage device 200 (S120). Upon the controller 201 of the storage device 200 receiving the first challenge information processing command, the storage device 200 makes a request of input of the first challenge information E(KPd2, Kfc1) (S122). In response to the request, the controller 101 of the recording device 100 outputs the first challenge information E(KPd2, Kfc1) to the storage device 200 (S124).

Upon the storage device 200 receiving the first challenge information E(KPd2, Kfc1) (S126), the control unit 220 of the encryption engine 203 transmits the first challenge information E(KPd2, Kfc1) to the first decryption unit 224. The first decryption unit 224 decrypts the first challenge information using the private key of the storage device 200, i.e., Kd2, thereby acquiring the challenge key Kfc1. Then, the challenge key Kfc1 thus acquired is transmitted to the first encryption unit 225 and the second encryption unit 228. The first encryption unit 225 and the second encryption unit 228 hold the challenge key Kfc1 thus received (S130).

On the other hand, upon completion of the processing instructed by the first challenge information processing command in the storage device 200, the controller 101 of the recording device 100 issues a first session information creating command to the storage device 200 (S132). Upon the controller 201 of the storage device 200 receiving the first session information creating command (S134), the random number generating unit 221 generates the session key Kfs2 according to instructions from the control unit 220 in the encryption engine 203 of the storage device 200. The session key Kfs2 thus generated is transmitted to the second decryption unit 226 and the first encryption unit 225. Note that the second decryption unit 226 holds the session key Kfs2 thus received (S136).

The first encryption unit 225 links the session key Kfs2 and the public key KPp2 of the storage device 200, and encrypts the linked key data using the challenge key Kfc1 held in Step S130. Thus, the first encryption unit 225 creates the first session information E(Kfc1, Kfs2//KPp2) (S138).

On the other hand, upon completion of the processing instructed by the first session information creating command in the storage device 200, the controller 101 issues a first session information output command (S140). Upon the storage device 200 receiving the first session information output command (S142), the controller 201 reads out the first session information E(Kfc1, Kfs2//KPp2), and outputs the first session information thus read out, to the controller 101 of the recording device 100 (S144).

Upon the controller 101 of the recording device 100 receiving the first session information E(Kfc1, Kfs2//KPp2) from the storage device 200, the controller 101 transmits the first session information thus received, to the encryption engine 103 (S146). Upon the encryption engine 103 receiving the first session information E(Kfc1, Kfs2//KPp2) (S148), the first decryption unit 123 decrypts the session information E(Kfc1, Kfs2//KPp2) using the challenge key Kfc1 stored therein, thereby acquiring the session key Kfs2 and the public key KPp2 of the storage device 200 (S150). The session key Kfs2 and the public key KPp2 thus acquired are transmitted to the third encryption unit 125 and the second encryption unit 124, respectively. The third encryption unit 125 and the second encryption unit 124 store the keys thus received, respectively (S152).

Subsequently, the random number generating unit 121 generates the challenge key Ksc1, and the challenge key Ksc1 thus generated is transmitted to the second encryption unit 124 and the fifth encryption unit 128. The fifth encryption unit 128 stores the challenge key Ksc1 therein, thereby allowing repeated processing using the same challenge key Ksc1 (S154). The second encryption unit 124 encrypts the challenge key Ksc1 using the public key KPp2 of the storage device 200, and transmits the encryption results to the third encryption unit 125. The third encryption unit 125 further encrypts the encryption results received from the second encryption unit 124 using the session key Kfs2, thereby creating the second challenge information E(Kfs2, E(KPp2, Ksc1)). Then, the second challenge information E(Kfs2, E(KPp2, Ksc1)) is transmitted to the controller 101 (S156).

Upon reception of the second challenge information E(Kfs2, E(KPp2, Ksc1)) (S158), the controller 101 issues a second challenge information processing command to the storage device 200 (S160). Upon the controller 201 of the storage device 200 receiving the second challenge information processing command, the storage device 200 makes a request of input of the second challenge information E(Kfs2, E(KPp2, Ksc1)) (S162). In response to the request, the controller 101 of the recording device 100 outputs the second challenge information E(Kfs2, E(KPp2, Ksc1)) to the storage device 200 (S164).

Upon the storage device 200 receiving the second challenge information E(Kfs2, E(KPp2, Ksc1)) (S166), the control unit 220 of the encryption engine 203 transmits the second challenge information E(Kfs2, E(KPp2, Ksc1)) to the second decryption unit 226. The second decryption unit 226 decrypts the second challenge information E(Kfs2, E(KPp2, Ksc1)) using the session key Kfs2 stored therein, thereby acquiring the encrypted challenge key E(KPp2, Ksc1). Then, the encrypted challenge key E(KPp2, Ksc1) thus acquired is transmitted to the third decryption unit 227. The third decryption unit 227 decrypts the encrypted challenge key E(KPp2, Ksc1) using the private key Kp2, which is a key forming a pair along with the public key KPp2, thereby acquiring the challenge key Ksc1 (S168). The challenge key Ksc1 thus acquired is transmitted to the fourth decryption unit 229, and is stored therein, thereby allowing the repeated processing using the same challenge key Ksc1 (S170).

On the other hand, upon completion of the processing instructed by the second challenge information processing command in the storage device 200, the controller 101 of the recording device 100 issues a second session information creating command to the storage device 2-00 (S172). Upon the controller 201 of the storage device 200 receiving the second session information creating command (S174), the random number generating unit 221 of the encryption engine 203 creates the session key Kss2 according to instructions from the control unit 220, and transmits the session key Kss2 thus created, to the fifth decryption unit 230 and the second encryption unit 228. Then, the fifth decryption unit 230 holds the session key Kss2 thus received (S176). The second encryption unit 228 encrypts the session key Kss2 using the challenge key Kfc1 held in the previous step S130, thereby creating the encrypted session key E(Kfc1, Kss2) (S178).

On the other hand, upon completion of the processing instructed by the second session information creating command in the storage device 200, the controller 101 of the recording device 100 issues a second session information output command (S180). Upon the storage device 200 receiving the second session information output command (S182), the controller 201 reads out the second session information E(Kfc1, Kss2) from the encryption engine 203, and outputs the second session information thus read out, to the controller 101 of the recording device 100 (S184).

Upon the controller 101 of the recording device 100 receiving the second session information E(Kfc1, Kss2) from the storage device 200, the controller 101 transmits the second session information thus received, to the encryption engine 103 (S186). Upon the encryption engine 103 receiving the second session information E(Kfc1, Kss2) from the controller 101 (S188), the second decryption unit 126 decrypts the second session information E(Kfc1, Kss2) using the challenge key Kfc1 stored therein, thereby acquiring the session key Kss2 (S190).

Subsequently, the fourth encryption unit 127 of the encryption engine 103 encrypts the license data LIC issued by the encryption device 104 using the session key Kss2 issued by the storage device 200. Then, the fifth encryption unit 128 further encrypts the license data LIC, which has been encrypted by the fourth encryption unit 127, using the challenge key Ksc1 created in Step S154, thereby creating the encrypted license data E(Ksc1, E(Kss2, LIC)). The encrypted license data E(Ksc1, E(Kss2, LIC)) thus created is transmitted to the controller 101 (S192).

Upon the controller 101 receiving the encrypted license data E(Ksc1, E(Kss2, LIC)) (S194), the controller 101 issues a license data writing command to the storage device 200 (S196). The license writing command includes an address for specifying the recording location in the tamper-resistant storage unit 204. Note that the address used here means "logical address". While the logical address does not directly specify the recording location in the tamper-resistant storage unit 204, the controller manages storage of data with the logical address, thereby allowing the user to read out the data using the same logical address as in the writing processing. Also, the storage device 200 may employ the physical address for directly specifying the recording location in the tamper-resistant storage unit 204.

Upon reception of the license writing command, the storage device 200 makes a request of input of the encrypted license data (S198). In response to the request, the controller 101 of the recording device 100 outputs the encrypted license data E(Ksc1, E(Kss2, LIC)) to the storage device 200 (S200). Upon the storage device 200 receiving the encrypted license data E(Ksc1, E(Kss2, LIC)) (S202), the storage device 200 transmits the encrypted license data E(Ksc1, E(Kss2, LIC)) thus received, to the fourth decryption unit 229 in the encryption engine 203.

The fourth decryption unit 229 decrypts the encrypted license data E(Ksc1, E(Kss2, LIC)) using the challenge key Ksc1 stored therein, thereby acquiring the encrypted license data E(Kss2, LIC), which has been encrypted using the session key Kss2. Then, the encrypted license data E(Kss2, LIC) thus acquired is transmitted to the fifth decryption unit 230. The fifth decryption unit 230 decrypts the encrypted license data E(Kss2, LIC) thus received, using the session key Kss2 which has been created and stored in Step S176, thereby acquiring the license data LIC (S204). The license data LIC thus acquired is supplied to the data bus 210 through the local bus 240 and the control unit 220. The controller 201 performs storage processing for storing the license data LIC thus supplied to the data bus 210, in a recording location in the tamper-resistant storage unit 204 according to a specified address (S206).

On the other hand, upon completion of the processing instructed by the license data writing command in the storage device 200, the controller 101 determines whether or not recording of the license data is to be continued (S208).

In a case of consecutively recording of the license data (In a case of "YES" in S208), the flow proceeds to Step S172, thereby restarting the processing starting from issuing of the session information creating command. With the present embodiment, the verification of the certificate is shared among multiple license-data writing procedures, thereby reducing the processing amount. While description has been made regarding an example in which multiple license data sets are consecutively recorded, with such a configuration, there is no need to record the next license data immediately following recording of certain license data. Rather, with such a configuration, the next data may be recording at a desired timing as long as the encryption engine 103 and the storage device 200 share the two challenge keys Kfc1 and Ksc1, and specifically, as long as the second decryption unit 126 of the encryption engine 103 of the recording device 100 and the second encryption unit 228 of the encryption engine 203 of the storage device 200 hold the same challenge key Kfc1, and the fifth encryption unit 128 of the encryption engine 103 of the recording device 100 and the fourth decryption unit 229 of the encryption engine 203 of the storage device 200 hold the same challenge key Ksc1.

Also, an arrangement may be made without any problems, in which the next data is recorded following the procedure starting from Step S102 even if the license data is consecutively recorded. On the other hand, in a case that the license data is not consecutively recorded (In a case of "NO" in S208), the processing ends successfully.

With the procedure described above, the license data, which is necessary for decrypting and reproducing the encrypted contents data, is stored in the storage device 200. On the other hand, the encrypted contents data is ordinary data. With the present embodiment, the encrypted contents data is directly stored in the ordinary data storage unit 205 of the storage device 200 according to ordinary commands. Note that description will be omitted regarding the storage processing for the ordinary data.

Note that the recording order of the license data and the encrypted contents data is not restricted. Furthermore, an arrangement may be made in which the secure command is issued in a divided form using free time in which the storage device 200 is not storing the encrypted contents data, thereby recording the license data. Note that FIGS. 8, 9, and 10, show an example of the procedure in which the recording device 100 stores the license data in the storage device 200, and the processing ends successfully.

Figure 11:
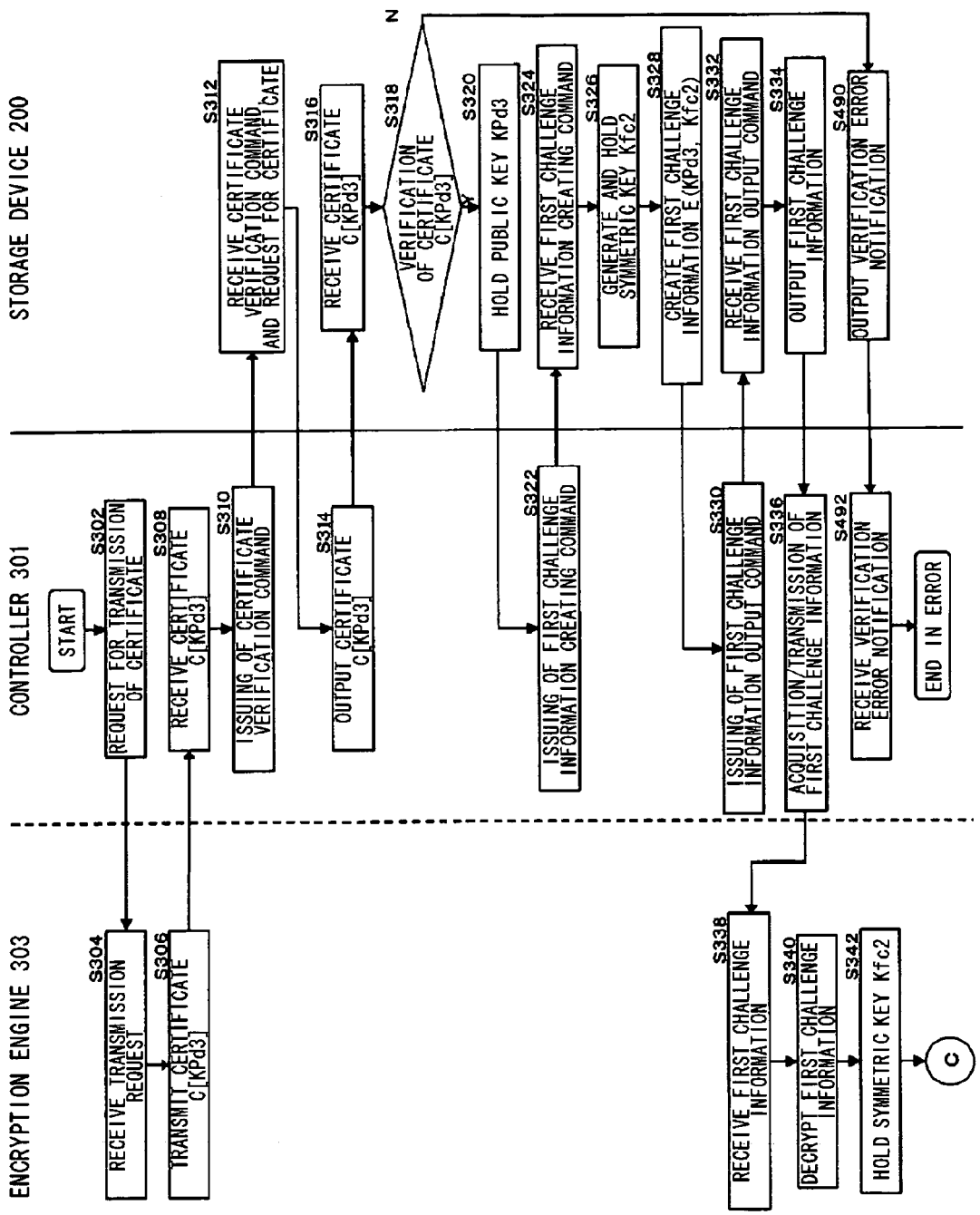
FIG. 11 is a diagram which shows a procedure up to a step in which the reproducing device reads out the license data from the storage device.
Figure 12:
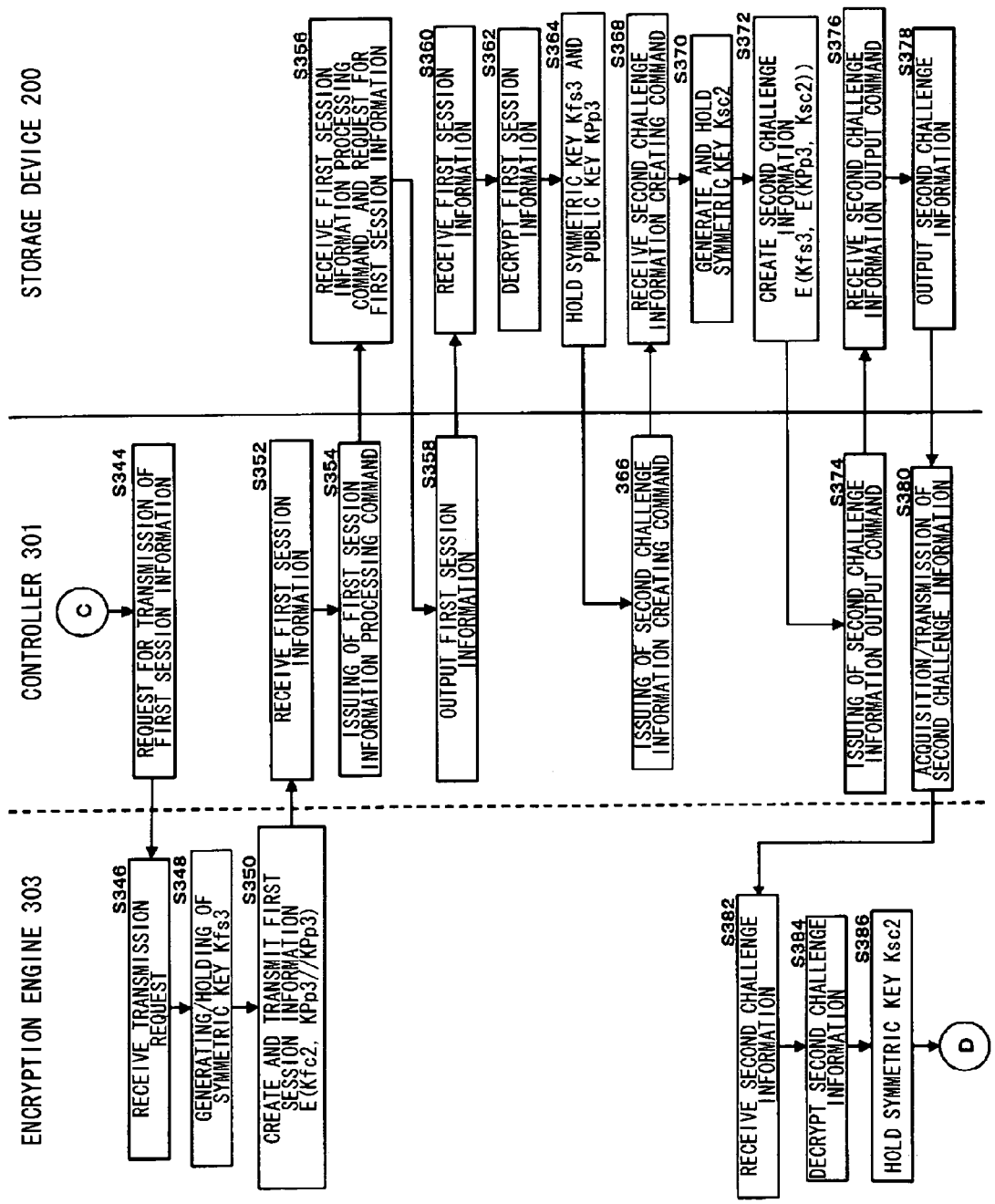
FIG. 12 is a diagram which shows a procedure up to a step in which the reproducing device reads out the license data from the storage device.
Figure 13:
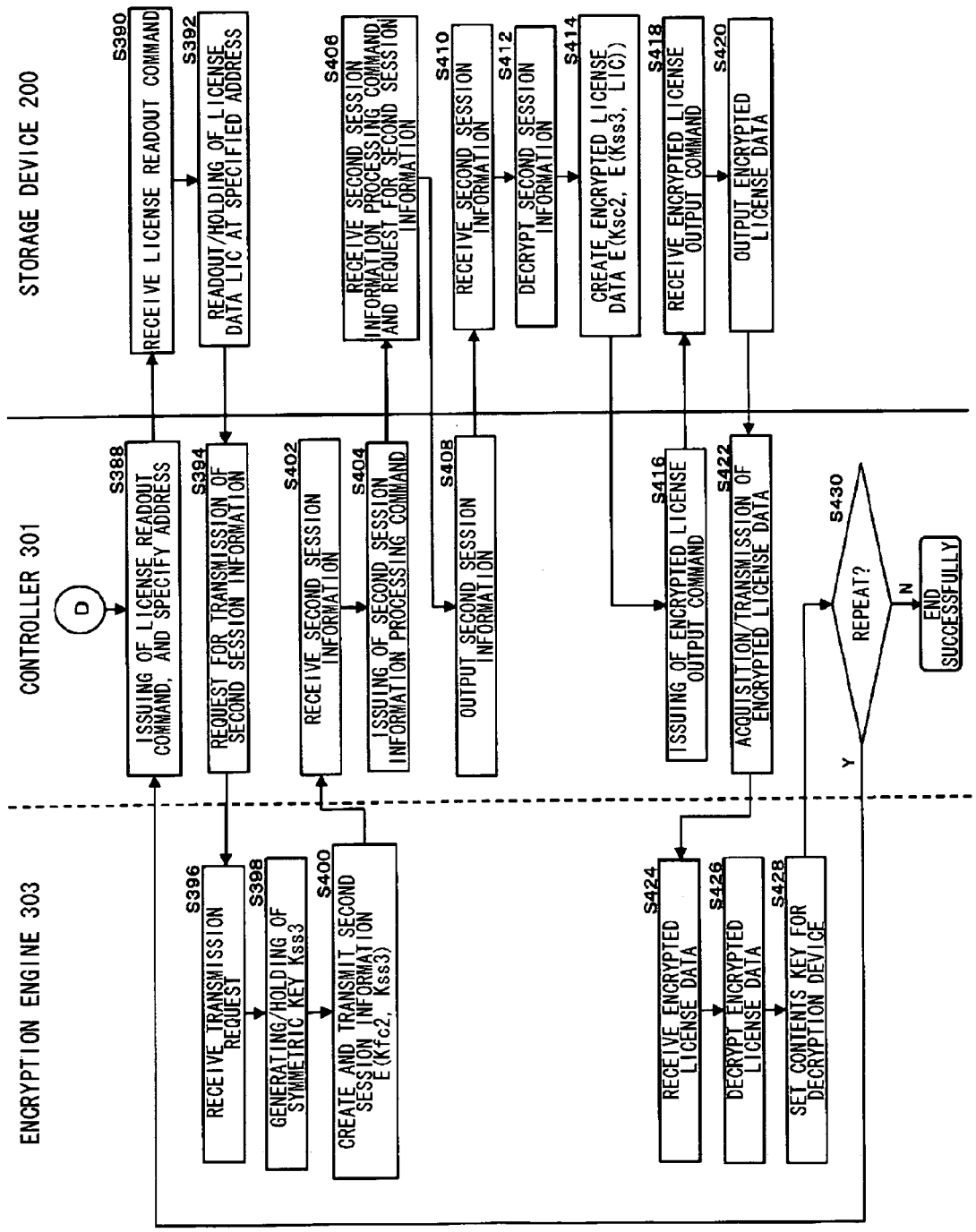
FIG. 13 is a diagram which shows a procedure up to a step in which the reproducing device reads out the license data from the storage device.

FIGS. 11, 12, and 13 show the procedure up to the step in which the reproducing device 300 reads out the license data from the storage device 200. First, the controller 301 of the reproducing device 300 makes a request of output of the certificate to the encryption engine 303 (S302). Upon the encryption engine 303 receiving the transmission request (S304), the certificate output unit 320 outputs the certificate C[KPd3] to the controller 301 (S306). Upon the controller 301 receiving the certificate C[KPd3] from the encryption engine 303 (S308), the controller 301 issues the certificate verification command to the storage device 200 (S310).

Upon reception of the certificate verification command, the storage device 200 makes a request of input of the certificate (S312). In response to the request, the controller 301 of the reproducing device 300 outputs the certificate C[KPd3] received from the encryption engine 303, to the storage device 200 (S314). Upon the storage device 200 receiving the certificate C[KPd3] (S316), the storage device 200 transmits the certificate C[KPd3] to the encryption engine 203 therewithin. In the encryption engine 203, the certificate verification unit 223 verifies the certificate C[KPd3] using the verification key KPa according to instructions from the control unit 220 (S318). In a case that the certificate has not been authenticated (In a case of "NO" in S318), the certificate verification unit 223 transmits a verification error notification to the controller 301 through the control unit 220, the controller 201, and the storage interface 202 (S490). In a case that the controller 301 has received the error notification (S492), the processing ends in error. On the other hand, in a case that the certificate C[KPd3] has been authenticated (In a case of "YES" in S318), the control unit 220 of the encryption engine 203 acquires the public key KPd3 from the certificate C[KPd3], and transmits the public key KPd3 thus acquired, to the third encryption unit 231. The third encryption unit 231 holds the public key KPd3 thus received (S320).

On the other hand, in a case that the certificate C[KPd3] of the encryption engine 303 is authenticated in the storage device 200, the controller 301 of the reproducing device 300 issues a first challenge information creating command (S322). Then, the storage device 200 receives the first challenge information creating command (S324). Subsequently, in the encryption engine 203, the random number generating unit 221 generates the challenge key Kfc2 according to instructions from the control unit 220, and transmits the challenge key Kfc2 thus generated, to the third encryption unit 231 and the sixth decryption unit 232. The sixth decryption unit 232 stores the challenge key Kfc2 therewithin (S326). Then, the third encryption unit 231 encrypts the session key Kfs2 using the public key KPd3 stored in Step S320, thereby creating the first challenge information E(KPd3, Kfc2).

On the other hand, upon completion of the processing instructed by the first challenge information creating command in the storage device 200, the controller 301 of the reproducing device 300 issues a first challenge information output command (S330). Upon the storage device 200 receiving the first challenge information output command (S332), the controller 201 acquires the first challenge information E(KPd3, Kfc2), and outputs the first challenge information E(KPd3, Kfc2) to the controller 301 of the reproducing device 300 (S334).

Upon reception of the first challenge information E(KPd3, Kfc2), the controller 301 of the reproducing device 300 transmits the first challenge information E(KPd3, Kfc2) thus received, to the encryption engine 303 (S336). Then, upon the encryption engine 303 receiving the first challenge information E(KPd3, Kfc2) (S338), the first decryption unit 322 decrypts the first challenge information E(KPd3, Kfc2) using the private key Kd3 of the reproducing device 300, thereby acquiring the challenge key Kfc2 (S340). Subsequently, the challenge key Kfc2 thus acquired is held by the first encryption unit 323 and the second encryption unit 326 (S342).

Next, the controller 301 makes a request of transmission of the first session information to the encryption engine 303 (S344). Upon the encryption engine 303 receiving the transmission request (S346), in the encryption engine 303, the random number generating unit 321 generates the session key Kfs3, and transmits the session key Kfs3 thus generated, to the first encryption unit 323 and the second decryption unit 324. The second decryption unit 324 stores the session key Kfs3 therewithin (S348). Then, the first encryption unit 323 links the session key Kfs3 and the public key KPp3 of the reproducing device 300, and decrypts the linked key data using the challenge key Kfc2, thereby creating the first session information E(Kfc2, Kfs3//KPp3). The first session information E(Kfc2, Kfs3//KPp3) is transmitted to the controller 301 (S350). Upon the controller 301 receiving the first session information E(Kfc2, Kfs3//KPp3) from the encryption engine 303 (S352), the controller 301 issues a first session information processing command to the storage device 200 (S354).

Upon the storage device 200 receiving the first session information processing command (S356), the storage device 200 makes a request of input of the first session information. In response to the request, the controller 301 of the reproducing device 300 outputs the first session information E(Kfc2, Kfs3//KPp3) received from the encryption engine 303, to the storage device 200 (S358). Upon the storage device 200 receiving the first session information E(Kfc2, Kfs3//KPp3) (S360), the storage device 200 transmits the first session information E(Kfc2, Kfs3//KPp3) thus received, to the sixth decryption unit 232 of the encryption engine 203.

The sixth decryption unit 232 decrypts the first session information E(Kfc2, Kfs3//KPp3) thus received, using the challenge key Kfc2 stored in Step S326. Thus, the sixth decryption unit 232 acquires the session key Kfs3 and the public key KPp3 of the reproducing device 300 (S362). The session key Kfs3 and the public key KPp3 thus acquired are transmitted to the fifth encryption unit 234 and the fourth encryption unit 233, respectively (S364).

On the other hand, upon completion of the processing instructed by the first session information processing command in the storage device 200, the controller 301 of the reproducing device 300 issues a second challenge information creating command to the storage device 200 (S366). Then, the storage device 200 receives the second challenge information creating command (S368). Subsequently, in the encryption engine 203, the random number generating unit 221 generates the challenge key Ksc2 according to instructions from the control unit 220, and transmits the challenge key Ksc2 thus generated, to the fourth encryption unit 233 and the seventh encryption unit 237. Then, the seventh encryption unit 237 stores the challenge key Ksc2 therewithin, thereby allowing the repeated processing using the same challenge key Ksc2 (S370). Subsequently, the fourth encryption unit 233 encrypts the challenge key Ksc2 using the public key KPp3 of the reproducing device 300 acquired beforehand, and transmits the encrypted challenge key Ksc2 to the fifth encryption unit 234. The fifth encryption unit 234 further encrypts the encrypted challenge key E(KPp3, Ksc2), which has been encrypted by the fourth encryption unit 233, using the session key Kfs3, thereby creating second challenge information E(Kfs3, E(KPp3, Ksc2)) (S372).

On the other hand, upon completion of the processing instructed by the second challenge information creating command in the storage device 200, the controller 301 of the reproducing device 300 issues a second challenge information output command (S374). Then, upon the storage device 200 receiving the second challenge information output command (S376), the controller 201 acquires the second challenge information E(Kfs3, E(KPp3, Ksc2)) from the encryption engine 203, and outputs the second challenge information E(Kfs3, E(KPp3, Ksc2)) thus acquired, to the controller 301 of the reproducing device 300 (S378).

Upon reception of the second challenge information E(Kfs3, E(KPp3, Ksc2)), the controller 301 of the reproducing device 300 transmits the second challenge information E(Kfs3, E(KPp3, Ksc2)) thus received, to the encryption engine 303 (S380). Upon the encryption engine 303 receiving the second challenge information E(Kfs3, E(KPp3, Ksc2)) (S382), the second decryption unit 324 decrypts the second challenge information E(Kfs3, E(KPp3, Ksc2)) using the session key Kfs3 stored therewithin. Then, the second decryption unit 324 transmits the decryption result, i.e., E(KPp3, Ksc2) to the third decryption unit 325. The third decryption unit 325 decrypts the decryption result thus received, using the private key Kp3 of the reproducing device 300, thereby acquiring the challenge key Ksc2 (S384). The challenge key Ksc2 thus acquired is transmitted to the fourth decryption unit 327. The fourth decryption unit 327 holds the challenge key Ksc2 thus received (S386).

The above is description regarding processing which is common in repeated access of the license data. Description will be made below regarding the processing executed for each access of the license data.

Then, the controller 301 of the reproducing device 300 issues a license readout command to the storage device 200 (S388). The license readout command includes an address for specifying the readout location in the tamper-resistant storage unit 204. Upon the storage device 200 receiving the license readout command (S390), the storage device 200 reads out the license data LIC stored at the specified address in the tamper-resistant storage unit 204. The license data LIC thus read out is held by the sixth encryption unit 236 of the encryption engine 203 (S392).

On the other hand, the controller 301 makes a request of transmission of the second session information to the encryption engine 303 (S394). Upon the encryption engine 303 receiving the transmission request (S396), in the encryption engine 303, the random number generating unit 321 generates the session key Kss3, and transmits the session key Kss3 thus generated, to the second encryption unit 326 and the fifth decryption unit 328. The fifth decryption unit 328 stores the session key Kss3 thus received (S398). Then, the second encryption unit 326 encrypts the session key Kss3 generated by the random number generating unit 321, using the challenge key Kfc2 stored in Step S342, thereby creating the second session information E(Kfc2, Kss3). The second session information E(Kfc2, Kss3) thus created is transmitted to the controller 301 (S400). Upon the controller 301 receiving the second session information E(Kfc2, Kss3) (S402), the controller 301 issues a second session information processing command to the storage device 200 (S404).

Upon reception of the second session information processing command, the storage device 200 makes a request of input of the session information (S406). In response to the request, the controller 301 of the reproducing device 300 outputs the second session information E(Kfc2, Kss3) received from the encryption engine 303, to the storage device 200 (S408).

Upon the storage device 200 receiving the second session information E(Kfc2, Kss3) (S410), the storage device 200 transmits the second session information E(Kfc2, Kss3) thus received, to the seventh decryption unit 235 of the encryption engine 203. The seventh decryption unit 235 decrypts the second session information E(Kfc2, Kss3) thus received, using the challenge key Kfc2 stored in Step S326. Thus, the seventh decryption unit 235 acquires the session key Kss3 issued by the reproducing device 300, and transmits the session key Kss3 thus acquired, to the sixth encryption unit 236 (S412). The sixth encryption unit 236 encrypts the license data LIC stored therein in Step S392, using the session key Kss3 issued by the reproducing device 300, thereby creating E(Kss3, LIC). The E(Kss3, LIC) thus created is transmitted to the seventh encryption unit 237. The seventh encryption unit 237 further encrypts the E(Kss3, LIC) thus received, using the challenge key Ksc2 stored therein in Step S370, thereby creating the encrypted license data E(Ksc2, E(Kss3, LIC)) (S414).

On the other hand, upon completion of the processing instructed by the session information processing command in the storage device 200, i.e., upon creation of the encrypted license data, the controller 301 of the reproducing device 300 issues an encrypted-license output command (S416). Upon the storage device 200 receiving the encrypted-license output command (S418), the controller 201 acquires the encrypted license data E(Ksc2, E(Kss3, LIC)) from the encryption engine 203, and outputs the encrypted license data E(Ksc2, E(Kss3, LIC)) thus acquired, to the controller 301 of the reproducing device 300 (S420).

Upon reception of the encrypted license data E(Ksc2, E(Kss3, LIC)) from the storage device 200, the controller 301 of the reproducing device 300 transmits the encrypted license data E(Ksc2, E(Kss3, LIC)) thus received, to the encryption engine 303 (S422). Then, upon the encryption engine 303 receiving the encrypted license data (S424), the fourth decryption unit 327 decrypts the encrypted license data E(Ksc2, E(Kss3, LIC)) using the challenge key Ksc2 stored therein in Step S386, and transmits the decryption result E(Kss3, LIC) to the fifth decryption unit 328. The fifth decryption unit 328 decrypts the decryption result E(Kss3, LIC) thus received, using the session key Kss3 stored therein in Step S398, thereby acquiring the license data LIC (S426). Then, the license data is transmitted to the decryption device 304 (S428). The license data is used by the decryption device 304 for decrypting the encrypted contents data.

With the procedure described above, the reproducing device 300 reads out the license data for decrypting the encrypted contents data, from the storage device 200.

On the other hand, let us consider a situation in which other license data is consecutively read out following readout of certain license data (in a case of "YES" in S430), the controller 301 may operate as follows. That is to say, the flow proceeds to Step S388, thereby restarting the procedure starting from the step where the license readout command is issued. With the present embodiment, the verification of the certificate is shared among multiple license-data writing procedures, thereby reducing the processing amount. While description has been made regarding an example in which multiple license data sets are consecutively read out, with such a configuration, there is no need to read out the next license data immediately following readout of certain license data. Rather, with such a configuration, the next data may be read out at a desired timing as long as the encryption engine 303 and the storage device 200 share the two challenge keys Kfc2 and Ksc2, and specifically, as long as the second encryption unit 326 of the encryption engine 303 of the reproducing device 300 and the seventh decryption unit 235 of the encryption engine 203 of the storage device 200 hold the same challenge key Kfc2, and the fourth decryption unit 327 of the encryption engine 303 of the reproducing device 300 and the seventh encryption unit 237 of the encryption engine 203 of the storage device 200 hold the same challenge key Ksc2. Also, an arrangement may be made without any problems, in which the next data is read out following the procedure starting from Step S302 even if the license data is consecutively read out. On the other hand, in a case that the license data is not consecutively read out (In a case of "NO" in S430), the processing ends successfully according to instructions from the controller 301.

Note that FIGS. 11, 12, and 13, show an example of the procedure in which the reproducing device 300 reads out the license data from the storage device 200, and the processing ends successfully.

With the procedure as described above, the license data stored in the storage device 200 can be duplicated in other storage devices (i.e., the license data stored in the storage device is available for use by other storage devices), thereby storing the license data in other storage devices. Also, with such a procedure, the license data stored in the storage device 200 can be moved to another storage device (i.e., the license data stored in the storage device 200 is deleted or revoked), thereby storing the license data in another storage device. Let us say that other storage devices, in which the license data are to be stored, have the same functions as the storage device 200. In this case, it is needless to say that the license data can be transmitted from one to another among these storage devices, and the storage device, which has received the license data, can store the license data thus received. In this case, the license data is transmitted from the storage device 200 to another storage device in the same way as the license data is supplied from the storage device 200 to the reproducing device 300. Also, the license data is transmitted from other storage devices to the storage device 200 in the same way as the license data supplied from the recording device 100 is stored in the storage device 200.

With the present embodiment described above, access (recording/readout) of the confidential data such as the license data is consecutively performed using the symmetric key encryption algorithm alone without reducing the security. The symmetric key encryption algorithm has the advantage of small computation amounts. Furthermore, the symmetric key encryption algorithm can be readily realized by hardware means. This allows high-speed access of the license data.

With the present embodiment as described above, encrypted confidential data is input/output between a storage device and a host device with improved processing efficiency without deterioration in the security in a situation in which access (recording/readout) of the license data is consecutively performed.

Note that description has been made regarding an arrangement in which with the receiver of the license data (In a case of recording, the storage device 200 serves as a receiver. In a case of readout, the reproducing device 300 serves as a receiver) as x, and with the transmitter of the license data (In a case of recording, the recording device 100 serves as a transmitter. In a case of readout, the storage device 200 serves as a transmitter) as y, the license data LIC is encrypted in the form of the encrypted license E(Kscy, E(Kssx, LIC)). Also, an arrangement may be made in which the license data LIC is encrypted in the form of the encrypted license E(Kssx, E(Kscy, LIC)), which has been encrypted twofold in the reverse order. Such an arrangement has the same advantages as with the present embodiment.

That is to say, with the present invention, the license data LIC is encrypted twofold using two temporary keys. One temporary key is temporarily created in the transmitter of the license data. On the other hand, the other temporary key is temporarily created in the receiver of the license data. Furthermore, one temporary key is preferably created for each transmission of the license data LIC. On the other hand, the other temporary key is preferably created for each verification of the certificate.

Description has been made in the present embodiment regarding an arrangement in which the session key Kssx is encrypted in the form of the second session information E(Kfcy, Kssx) using the challenge key Kfcy. Also, an arrangement may be made in which the session key Kssx is encrypted in the form of the second session information E(Kscy, Kssx) using the other challenge key Kscy.

Description has been made in the present embodiment regarding an arrangement in which only the license receiver transmits the public key certificate C[KPdx] of the license receiver to the license transmitter, thereby verifying the validity of the license receiver alone. An arrangement may be made in which the license transmitter also transmits the public key certificate C[KPdy] of the license transmitter to the license receiver, in addition to transmission of the public key certificate C[KPdx] of the license receiver described in the present embodiment, which allows the license receiver to verify the validity of the license transmitter. With such an arrangement, verification of the license transmitter is performed as follows, for example. That is to say, first, the license transmitter transmits the public key certificate C[KPdy] thereof as well as the first challenge information E(KPdx, Kfcy). Second, the license receiver receives the public key certificate, and verifies the public key certificate thus received. Third, at least one of the session key Kfsx and the public key KPpx, each of which is to be transmitted from the receiver, is encrypted twofold using the public key KPdy acquired from the public key certificate C[KPdy] and the challenge key Kfcy, thereby creating the second session information in a double-encrypted form.

Specifically, with such an arrangement having a function of the aforementioned processing, the encryption engine 103 includes: a certificate output unit for holding and outputting the public key certificate C[KPd1]; and a decryption unit for decrypting the data, which has been encrypted using the public key KPd1, using the private key Kd1. Furthermore, the encryption engine 303 includes a certificate verification unit for verifying the certificate C[KPd2] provided from external components, and an encryption unit for encrypting data using the public key KPd2 contained in the certificate.

With such an arrangement, the license receiver has a function of rejecting recording of the license data from a license transmitter with insufficient security, or from an unauthorized license transmitter. This secures further improved security, thereby properly protecting the right of the author and so forth.

With the procedure described above, examples of algorithms employed in the public key cryptosystem include RAS, EC-DH (Elliptic Curve Diffie-Hellman scheme), and so forth. With an arrangement employing the EC-DH, the shared key which is shared between the license transmitter and the license receiver using the EC-DH cryptosystem may be employed as a symmetric key for encrypting the license data LIC, instead of the challenge key Ksc1.

With the EC-DH, data is encrypted with a symmetric key (which is also referred to as "shared key") shared between the transmitter and the receiver, using multiplication on an elliptic curve on an infinite field (The encryption algorithm will be referred to as "elliptic curve cryptography algorithm"). In this case, the encrypted data has a data structure in which two data components are linked. One is encrypted data (encryption results). The other is the data (which will be referred to as "parameter") which allows sharing of the shared key between the transmitter and the receiver.

For example, description will be made regarding transmission of encrypted data using a public key KPpx and a private key Kpx. With the EC-DH, the relation between the public key KPpx and the private key Kpx is represented by Expression, KPpx=Kpx*B. Here, "B" represents the base point on the elliptic curve, and an asterisk "*" represents multiplication on the elliptic curve. The shared key which is shared between the license transmitter and the license receiver is represented as "KPpxECDHy" hereinafter. Note that description will be made regarding an arrangement with a device receiving encrypted data (which will be referred to as "receiver") as "x", and with another device providing the encrypted data (which will be referred to as "transmitter") as "y".

First, the receiver transmits a public key KPpx to the transmitter. Upon the transmitter receiving the public key KPpx, the transmitter generates a random number rdy for creating encrypted data. Then, the transmitter multiplies the public key KPpx by the random number rdy on the elliptic curve, thereby computing a coordinate on the elliptic curve KPpx*rdy. Then, the transmitter assigns the coordinate thus computed into a key generating function F( ), thereby computing the shared key KPpxECDHy=F(KPdx*rdy). At the same time, the transmitter computes a parameter B*rdy for sharing the shared key KPpxECDHy between the transmitter and the receiver. Note that the base point B, the key generating function F( ), and the equation of the elliptic curve are shared between the transmitter and the receiver beforehand.

Then, data (which will be referred to as "Data"), which is to be encrypted, is encrypted using the shared key KPpxECDHy thus created, thereby creating encrypted data Es(KPpxECDHy, Data). Subsequently, the transmitter links the parameter B*rdy and the encrypted data Es(KPpxECDHy, Data), thereby creating the linked result (B*rdy)//Es(KPpxECDHy, Data). The linked result (B*rdy)//Es(KPpxECDHy, Data) thus obtained is transmitted to the receiver as Ep(KPpx, Data).

Here, the symbol "Es" represents an encryption function based upon the symmetric-key cryptosystem. For example, Expression Es(KPpxECDHy, Data) represents the encrypted data in which Data, which is to be encrypted, is encrypted using the symmetric key KPpxECDHy. Also, the symbol "Ep" represents an encryption function based upon the public-key cryptosystem. For example, Expression Ep(KPpx, Data) represents encrypted data in which Data, which is to be encrypted, is encrypted using the public key KPpx. As described above, with the EC-DH, Ep(KPpx, Data) is represented by B*rdy//Es(KPpxECDHy, Data).

Upon the receiver receiving Ep(KPpx, Data), the receiver multiplies the parameter B*rdy by the private key Kpx stored therein on the elliptic curve, thereby obtaining the coordinate on the elliptic curve Kpx*B*rdy=KPpx*rdy. Then, the receiver computes the shared key KPpxECDHy. Then, the receiver decrypts the encrypted data Es(KPpxECDHy, Data) using the shared key KPpxECDHy thus obtained. The same can be said of the relation between the public key KPdx and the private key Kdx. As described above, sharing the symmetric key and transmission/reception of the encrypted data are performed at the same time.

With the procedure described above, the license LIC data may be encrypted using a shared key shared between the transmitter and the receiver based upon the EC-DH algorithm as the challenge key. For example, when the data is encrypted using the public key KPpx and transmitted, the aforementioned shared key may be used as the challenge key Ksc1 or the challenge key Ksc2. The shared key KPpxECDHy is issued from the public key KPpx of the license receiver, but may be handled as a symmetric key generated by the license transmitter, because the shared key is determined by the random number rpy generated by the license transmitter. In this case, the license data LIC is encrypted using the shared key as the challenge key and the session key generated just before the encryption, and transmitted from the license transmitter to the license receiver. The encrypted license data LIC may be in the form of E(KPpxECDHy, E(Kssx, LIC)), or E(Kssx, E(KPpxECDHy, LIC)), in this case.

Second Embodiment

Figure 14:
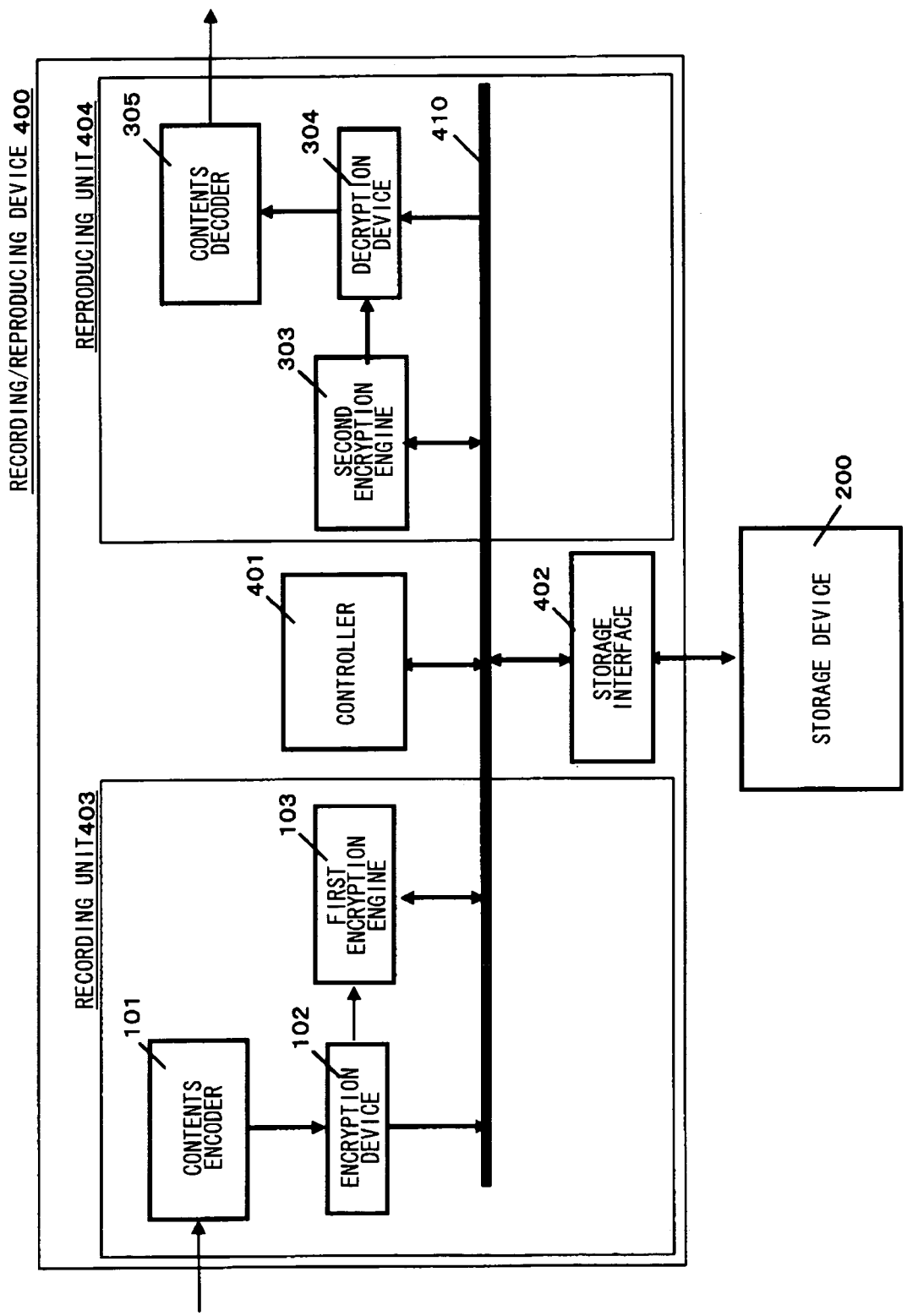
FIG. 14 is a diagram which shows an internal configuration of a recording/reproducing device according to a second embodiment.

FIG. 14 shows a configuration of a recording/reproducing device 400 according to a second embodiment. With the present embodiment, the recording device 100 and the reproducing device 300 according to the first embodiment are realized in the form of a single device, i.e., the recording/reproducing device 400.

The recording/reproducing device 400 according to the present embodiment includes a controller 401, a storage interface 402, a recording unit 403, a reproducing unit 404, and a data bus 410 for connecting at least a part of these components.

The recording unit 403 has the same configuration as that of the recording device 100 according to the first embodiment shown in FIG. 2. On the other hand, the reproducing unit 404 has the same configuration as that of the reproducing device 300 shown in FIG. 3. Note that in the drawing, the same components as those in the first embodiment are denoted by the same reference numerals.

The first encryption engine 103 according to the present embodiment corresponds to the encryption engine 103 of the recording device 100 according to the first embodiment. The second encryption engine 303 according to the present embodiment corresponds to the encryption engine 303 of the reproducing device 300 according to the first embodiment. The first encryption engine 103 according to the present embodiment has the same internal configuration as that of the encryption engine 103 according to the first embodiment shown in FIG. 5. The second encryption engine 303 according to the present embodiment has the same internal configuration as that of the encryption engine 303 according to the first embodiment shown in FIG. 6.

The controller 401 has both the same functions as those of the controller 101 of the recording device 100 and the same functions as those of the controller 301 of the reproducing device 300 according to the first embodiment. The storage interface 402 controls input/output of data between the recording/reproducing device 400 and the storage device 200. The data bus 410 electrically connects the components of the recording/reproducing device 400.

The recording/reproducing device 400 according to the present embodiment operates in the same way as with the recording device 100 and the reproducing device 300 according to the first embodiment. Specifically, the same can be said of the operation of the recording/reproducing device 400 according to the present embodiment as described in the first embodiment, replacing the controllers 101 and the 301 with the controller 401, replacing the storage interfaces 102 and 104 with the storage interface 402, and replacing the data buses 110 and 310 with the data bus 410.

While description has been made in the present embodiment regarding an arrangement in which the recording unit 403 and the reproducing unit 404 include the first encryption engine 103 and the second encryption engine 303, respectively, an arrangement may be made in which the recording unit 403 and the reproducing unit 404 share a single encryption engine having the functional blocks included in the encryption engines 103 and 303. With such a configuration, the single encryption engine has the same configuration as that of the encryption engine 203 of the storage device 200 shown in FIG. 7 according to the first embodiment.

Third Embodiment

Figure 15:
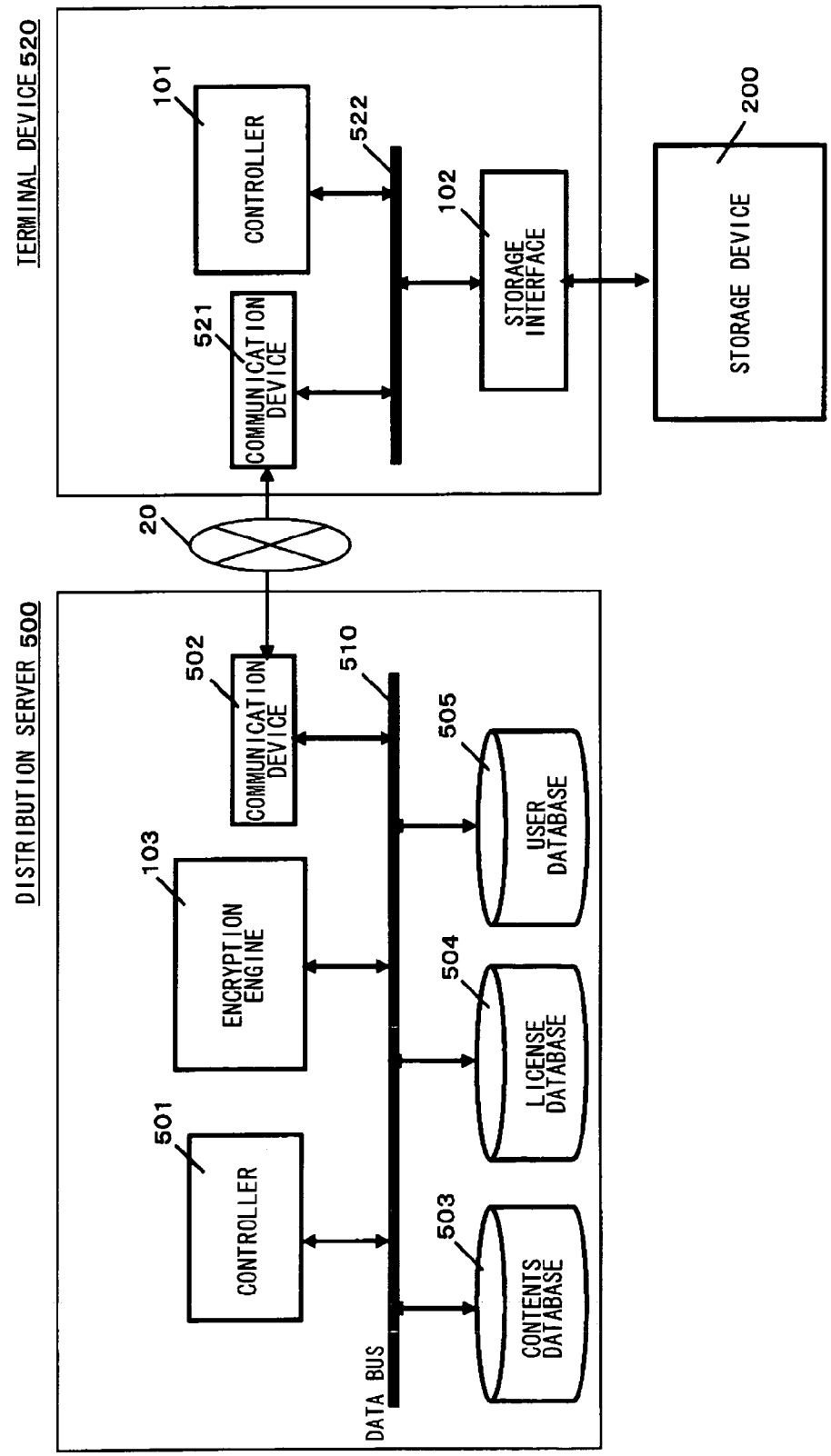
FIG. 15 is a diagram which shows an internal configuration of a contents distribution system according to a third embodiment.

FIG. 15 shows a configuration of contents distribution system according to a third embodiment. With the present embodiment, the recording device 100 according to the first embodiment is realized by a distribution server 500 for distributing contents and a terminal device 520 for receiving the contents thus provided. Note that in the drawing, the same components as those of the recording device 100 according to the first embodiment are denoted by the same reference numerals.

The distribution server 500 includes an encryption engine 103, a communication device 502, a contents database 503, a license database 504, a user database 505, a controller 501 for controlling these components, and a data bus 510 for electrically connecting these components. The terminal device 520 includes the controller 101, the storage interface 102, a communication device 521, and a data bus 522 for electrically connecting these components. The distribution server 500 and the terminal device 520 are connected to the Internet 20 which is an example of a network through the communication devices 502 and 521, respectively.

The encryption engine 103 of the distribution server 500 has the same functions as those of the encryption engine 103 according to the first embodiment. The controller 101 and the storage interface 102 of the terminal device 520 have the same functions as those of the controller 101 and the storage interface 102 according to the first embodiment, respectively.

The contents database 503 holds contents data which are to be provided to the user. The license database 504 holds license data containing a contents key for encrypting the contents data. With the present embodiment, the contents data is stored in the contents database 503 in the form of encrypted data which has been encrypted using the contents key. Also, an arrangement may be made in which the distribution server 500 further including the contents encoder 105 and the encryption device 104 reads out non-encrypted contents data from the contents database 503 storing the non-encrypted contents data, and encodes and encrypts the contents data thus read out, thereby creating encrypted contents data.

The user database 505 holds the user information regarding the user to which the contents are to be provided. For example, the user database 505 may hold the user private information, the address of the user terminal device 520, the purchase history regarding contents, fee information, and so forth. The controller 501 reads out encrypted contents from the contents database 503, and provides the encrypted contents thus read out, to the user, in response to the request from the user. Then, the controller 501 provides license data to the user, which allows the encryption engine 103 to decrypt the encrypted contents, following which the controller 501 updates the user database 505 for the contents fee of the contents providing service.

The contents distribution system according to the present embodiment has the same configuration as the system according to the first embodiment, replacing the data bus 510, the communication device 502, the Internet 20, the communication device 512, and the data bus 522, with the data bus 110 for electrically connecting the components included in the system. The contents distribution system according to the present embodiment performs encryption input/output processing following the same procedure as with the first embodiment.

With the present embodiment, the encryption engine 103 and the controller 101 communicate with each other via the Internet 20. With such a configuration, the encryption engine 103 and the controller 101 perform transmission/reception of data in the form of encrypted communication at all times as described above with reference to FIGS. 8 through 10. Thus, the communication is made with high tamper-resistant performance between the encryption engine 103 and the controller 101, even though via the Internet.

An arrangement may be made in which the storage device 200 is mounted to the reproducing device 300 according to the first embodiment, or the recording/reproducing device 400 according to the second embodiment, thereby allowing reproducing of the contents. Also, an arrangement may be made in which the terminal device 520 includes the reproducing unit 404 of the recording/reproducing device 400, thereby allowing reproducing of the contents.

As described above, description has been made regarding the present invention with reference to the aforementioned embodiments. The above-described embodiments have been described for exemplary purposes only, and are by no means intended to be interpreted restrictively. Rather, it can be readily conceived by those skilled in this art that various modifications may be made by making various combinations of the aforementioned components or the aforementioned processing, which are also encompassed in the technical scope of the present invention.

For example, while description has been made in the aforementioned embodiments regarding arrangements in which the encryption engine includes separate functional blocks of a functional block for encryption and a functional block for decryption, such functional blocks share the circuit on a component basis. This enables a reduced circuit scale, thereby reducing the size of the system and power consumption thereof.

With the present invention, various modifications may be made as appropriate within the scope of the technical idea of the present invention as laid forth in the appended claims.

What is claimed is:

1. A content usage right information providing device for providing content usage right information containing a content key for decrypting encrypted content data to a content usage right information receiving device, said content usage right information providing device comprising:
an interface for controlling transmission/reception of data to/from said content usage right information receiving device;
a cipher engine connected to the interface, comprising:
a symmetric key creating unit for creating a first symmetric key, a second symmetric key and random number, each of which is a temporary key, for transmitting said content usage right information;
a first encryption unit for encrypting data using a first public key set for said content usage right information receiving device;
a second encryption unit for encrypting data using a second public key set for said content usage right information receiving device and a third public key created by said content usage right information receiving device; wherein the encryption is done with the second public key in which the random number created by the symmetric key creating unit is used and a fifth symmetric key is calculated in the encryption;
a third encryption unit for encrypting data using said fourth symmetric key and a fifth symmetric key created by said content usage right information receiving device, and
a decryption unit for decrypting encrypted data using said first symmetric key or said second symmetric key; and
a controller connected to said cipher engine and said interface executing instructions for providing content usage right information, execution of the instructions causing the content usage right information providing device to perform operations comprising:
receiving said first public key through said interface, and transmitting said first public key thus received, to said first encryption unit,
creating said first symmetric key, and transmitting said first symmetric key thus created, to said first encryption unit,
receiving said first symmetric key which has been encrypted using said first public key from said first encryption unit, and outputting encrypted first symmetric key thus received through said interface
receiving said third symmetric key and said second public key, both of which have been concatenated and encrypted using said first symmetric key from said second encryption unit, through said interface, and transmitting said third symmetric key and said second public key which have been concatenated and encrypted thus received, to said decryption unit,
creating said second symmetric key and said random number, and transmitting said second symmetric key and said random number thus created, to said second encrypting unit, outputting said second symmetric key which has been encrypted using said third symmetric key and said second public key, through said interface, receiving said fifth symmetric key, which has been encrypted using said first symmetric key or said second symmetric key through said interface, and transmitting said encrypted fifth symmetric key thus received, to said decryption unit, and receiving said content usage right information, which has been encrypted using said fourth symmetric key and said fifth symmetric key from said third encryption unit, and outputting said encrypted content usage right information thus received through said interface.

2. The content usage right information providing device according to claim 1, wherein when said controller provides consecutively said content usage right information to said same content usage right information receiving device, said controller receives a new fifth symmetric key, which has been encrypted using said first symmetric key or said second symmetric key, and transmits said new encrypted fifth symmetric key to said second decryption unit and outputs encrypted content usage right information, which has been encrypted using said fourth symmetric key and said new fifth symmetric key, through said interface.

3. A content usage right information receiving device for receiving content usage right information containing a content key for decrypting and reproducing encrypted content data from a content usage right information providing device, said content usage right information receiving device comprising:

an interface for controlling transmission/reception of data to/from said content usage right information receiving device;

a cipher engine connected to said interface and the key holding units, comprising:
a first public key holding unit for holding a first public key set for said content usage right information receiving device;
a first private key holding unit for holding a first private key for decrypting encrypted data which has been encrypted using said first public key;
a second public key holding unit for holding a second public key set for said content usage right information receiving device;
a second private key holding unit for holding a second private key for decrypting encrypted data which has been encrypted using said second public key;
a symmetric key creating unit for creating a first symmetric key and a second symmetric key, each of which is a temporary key, at the time of reception of content usage right information from said content usage right information providing device;
an encryption unit for encrypting data using said third symmetric key or a fourth symmetric key, each of which have been created by said content usage right information providing device;
a first decryption unit for decrypting encrypted data, which has been encrypted using a first public key, using said first private key;
a second decryption unit for decrypting data, which has been encrypted using a second public key and said first symmetric key; wherein a fifth symmetric key is calculated with said second public key and an encrypted data, which has been encrypted using said second symmetric key; and a third decryption unit for decrypting encrypted data, which has been encrypted using said second symmetric key and said fifth symmetric key, using said second symmetric key and said fifth symmetric key;

a controller connected to the cipher engine and said interface, executing instructions for receiving content usage information execution of the instructions causing the content usage right information receiving device to perform operations comprising:

outputting said first public key through said interface, receiving said third symmetric key, which has been encrypted using said first public key, through said interface, and transmitting said encrypted third symmetric key thus received, to said first decryption unit, creating said first symmetric key, concatenating said created first symmetric key and said second public key, and transmitting said first symmetric key and said second public key, which have been concatenated, to said encryption unit, receiving said first symmetric key and said second public key, which have been encrypted using said third symmetric key, from said encryption unit, and outputting said first symmetric key and said second public key which have been encrypted, through said interface, receiving said fourth symmetric key, which has been encrypted using said first symmetric key and said second public key, through said interface, and transmitting said encrypted forth symmetric key thus received, to said second decryption unit, creating said second symmetric key, and transmitting said second symmetric key thus created, to said encryption unit, receiving said second symmetric key, which has been encrypted using said third symmetric key or said fourth symmetric key decrypted by said first decryption unit or said second decryption unit, from said encryption unit, and outputting encrypted second symmetric key thus received through said interface, and receiving encrypted content usage right information, which has been encrypted using said second symmetric key and said fifth symmetric key, through said interface, and transmitting said encrypted content usage right information to said third decryption unit, and receiving said content usage right information from said third decryption unit.

4. The content usage right information receiving device according to claim 3, wherein when said controller receives consecutively said content usage right information from said same content usage right information providing device, said controller instructs said symmetric key creating unit to create a new second symmetric key;

said controller outputs said new second symmetric key, which has been encrypted by said encryption unit using either said third symmetric key or said fourth symmetric key, through said interface;

said controller receives encrypted content usage right information, which has been encrypted using said new second symmetric key and said fifth symmetric key, through said interface.

* * * * *